US007752031B2

(12) United States Patent
Childress et al.

(10) Patent No.: US 7,752,031 B2
(45) Date of Patent: Jul. 6, 2010

(54) CADENCE MANAGEMENT OF TRANSLATED MULTI-SPEAKER CONVERSATIONS USING PAUSE MARKER RELATIONSHIP MODELS

(75) Inventors: Rhonda L. Childress, Austin, TX (US); Stewart Jason Hyman, Richmond Hill (CA); David Bruce Kumhyr, Austin, TX (US); Stephen James Watt, Leander, TX (US)

(73) Assignee: International Business Machines Corporation, Armonk, NY (US)

( * ) Notice: Subject to any disclaimer, the term of this patent is extended or adjusted under 35 U.S.C. 154(b) by 1014 days.

(21) Appl. No.: 11/388,015

(22) Filed: Mar. 23, 2006

(65) Prior Publication Data

US 2007/0225967 A1 Sep. 27, 2007

(51) Int. Cl.
*G10L 21/04* (2006.01)
*G10L 19/14* (2006.01)
*G06F 17/28* (2006.01)

(52) U.S. Cl. ............................ 704/2; 704/211; 704/503

(58) Field of Classification Search ....................... None
See application file for complete search history.

(56) References Cited

U.S. PATENT DOCUMENTS 4,653,098 A 3/1987 Nakata et al.
6,154,720 A 11/2000 Onishi et al.
6,233,561 B1 5/2001 Junqua et al.
6,556,972 B1 * 4/2003 Bakis et al. ................. 704/277
6,917,920 B1 7/2005 Koizumi et al.
7,069,222 B1 * 6/2006 Borquez et al. ............. 704/277
7,287,221 B2 10/2007 Bodin et al.
7,366,671 B2 * 4/2008 Xu et al. ...................... 704/270
2002/0022954 A1 2/2002 Shimohata et al.
2004/0024582 A1 * 2/2004 Shepard et al. ................ 704/2
2004/0243392 A1 * 12/2004 Chino et al. ................... 704/7

OTHER PUBLICATIONS

Wikipedia, "Audio timescale-pitch modification", downloaded from http://www.wikipedia.com on Feb. 22, 2006.

The Sonic Spot, "Audio File Formats", downloaded from http://www.sonicspot.com/guide/fileformatlist.html on Feb. 3, 2006.

The Sonic Spot, "Wave File Format", downloaded from http://www.sonicspot.com/guide/wavefiles..html on Feb. 3, 2006.

(Continued)

*Primary Examiner*—Matthew J Sked
(74) *Attorney, Agent, or Firm*—Robert H. Frantz; David A. Mims, Jr.; William H. Steinberg

(57) ABSTRACT

Multiple speaker cadence is managed for translated conversations by separating a multi-speaker audio stream into single-speaker audio tracks containing one or more first language audio snippets organized according to a timing relationship as related in the multi-speaker audio stream, generating a pause relationship model by determining time relationships between the single-speaker snippets and assigning pause marker values denoting the each beginning and each ending of each mutual silence pause, collecting a translated language audio track corresponding to each single-speaker track, generating pause relationship controls according the pause relationship model, and producing a translated multi-speaker audio output including the translated tracks in which the translated snippets are related in time according to the pause relationship controls.

30 Claims, 22 Drawing Sheets

OTHER PUBLICATIONS

Zimmermann, G., and Vanderheiden, G., "Translation on Demand Anytime Anywhere", downloaded on Jan. 13, 2005 from http://www.csun.edu/cod/conf/2001/proceedings/0184zimmerman.htm.

Shupe, R., "Create Sound Synchronization Magic in Flash, Part 2", downloaded on Jan. 13, 2006 from http://www.devx.com/webdev/Article/27924.

Kakumanu, P., "Speech Driven Facial Animation", Write State University, Nov. 15, 2001.

W3C,"Synchronized Multimedia", downloaded on Jan. 13, 2006 from http://www.w3.org/AudioVideo/.

Unknown Author, "SMPTE and Video In the Electronic Music Studio", University of California at Santa Cruz, retrieved on Apr. 22, 2009 from http://arts.ucsc.edu/EMS/Music/equipment/video/smpte/SMPTE.html.

WHATIS.COM, "SMPTE", retrieved on Apr. 22, 2009 from http://whatis.techtarget.com.

Makhoul, John, et al.; "Speech and Language Technologies for Audio Indexing and Retrieval"; Point Point presentation, retrieved on Mar. 26, 2009 from: http://www.vc.cs.nthu.edu.tw/home/paper/codfiles/ckwu/200104161722/20010329.ppt.

Makhoul, John, et al.; "Speech and Language Technologies for Audio Indexing and Retrieval"; Point Point presentation, retrieved on Mar. 26, 2009 from: http://w.vc.cs.nthu.edu.tw/home/paper/codfiles/ckwu/200104161722/20010329.ppt.

USPTO; Image File Wrapper from U.S. Appl. No. 11/428,025, filed Jun. 30, 2006, allowed but abandoned, 148 pages, retrieved from http://www.uspto.gov Private PAIR.

* cited by examiner

1000

Synchronization Mode for Language'

| 1001 Interpause Timing Mode | 1002 Synchronize to Original Track | 1003 Interchange Period $PM_1 \rightarrow PM_2 \rightarrow PM_1' \rightarrow PM_2''$ | |
|---|---|---|---|
| Absolute to PM Start | No | $T_3' = (T_3 - T_1) + T_1'$ | Eq. 1 |
| | | $T_1' \geq T_1 = PM_1$ | Eq. 2 |
| | Yes | $T_3' = T_3$ | Eq. 3 |
| | | $T_1' = T_1 = PM_1$ | Eq. 4 |
| Relative to PM Start and End (Proportional) | No | $T_3' = \left[\frac{(T_3 - T_1)}{PM_2 - PM_1} \cdot (PM_2' - PM_1')\right] + T_1'$ | Eq. 5 |
| | | $T_1' \geq T_1 = PM_1$ | Eq. 6 |
| | Yes | $T_3' = \left[\frac{(T_3 - T_1)}{PM_2 - PM_1} \cdot (PM_2' - PM_1')\right] + PM_1$ | Eq. 7 |
| | | $T_1' = T_1 = PM_1$ | Eq. 8 |

Figure 10a

1004

Synchronization Mode for Language$^i$

| Interpause Timing Mode (1001) | Synchronize to Original Track (1002) | Interchange Period $PM_1 \rightarrow PM_2 \Rightarrow PM_1' \rightarrow PM_2''$ (1005) |
|---|---|---|
| Absolute to PM Start | No | $T_3^i = (T_3 - T_1) + T_1^i$<br>$T_1^i \geq T_1 = PM_1$ |
| | Yes | $T_3^i = T_3$<br>$T_1^i = T_1 = PM_1$ |
| Relative to PM Start and End (Proportional) | No | $T_3^i = \left[\frac{(T_3 - T_1)}{PM_2 - PM_1} \bullet (PM_2^i - PM_1^i)\right] + T_1^i$<br>$T_1^i \geq T_1 = PM_1$ |
| | Yes | $T_3^i = \left[\frac{(T_3 - T_1)}{PM_2 - PM_1} \bullet (PM_2^i - PM_1^i)\right] + PM_1$<br>$T_1^i = T_1 = PM_1$ |

Figure 10b

CADENCE MANAGEMENT OF TRANSLATED MULTI-SPEAKER CONVERSATIONS USING PAUSE MARKER RELATIONSHIP MODELS

BACKGROUND OF THE INVENTION

1. Field of the Invention

This invention pertains to technologies employed in translation of multi-track, multi-speaker audio conversations in real-time, and non-real-time, for applications in live conferences, movies, television broadcasts, multimedia presentations, streaming audio, streaming video, and the like.

2. Background of the Invention

There are many scenarios in which multiple speakers may speak simultaneously, and in which one or more of the speaker's audio must be translated into one or more secondary languages. These scenarios may be divided into two main categories: (a) real-time or live translation, and (b) post or non-real-time translation.

Real-time translations are required during live broadcasts or live meetings, such as a United Nations plenary session. During these sessions, speakers of hundreds of languages may be present, such that when one speaker is talking in a primary language, live translators interpret the first speaker's phrases, and provide translated audio to speakers of other languages (e.g. listeners), in real-time, as speeches are given.

Non-realtime or post translations are translations which may be made after the fact, or after the complete delivery of a speech. Movie audio tracks, and audio tracks of previously-recorded streaming video, are two such scenarios, in which there may be less of a demand for speed of translation, but more demand for synchronization of the translated audio to other events, such as scenes in video. However, in some other post-processing scenarios, there may be a near realtime demand, such as the translation of podcasts following a live online event, or following the uploading of a podcast in a primary language.

BRIEF DESCRIPTION OF THE DRAWINGS

The following detailed description when taken in conjunction with the figures presented herein provide a complete disclosure of the invention.

FIG. 10*a* shows pause relationship modes and corresponding timing calculations for a first language of translation of a multi-speaker conversation.

FIG. 10*b* shows pause relationship modes and corresponding timing calculations for an $n^{th}$ language of translation of a multi-speaker conversation.

SUMMARY OF THE INVENTION

Figure 1:
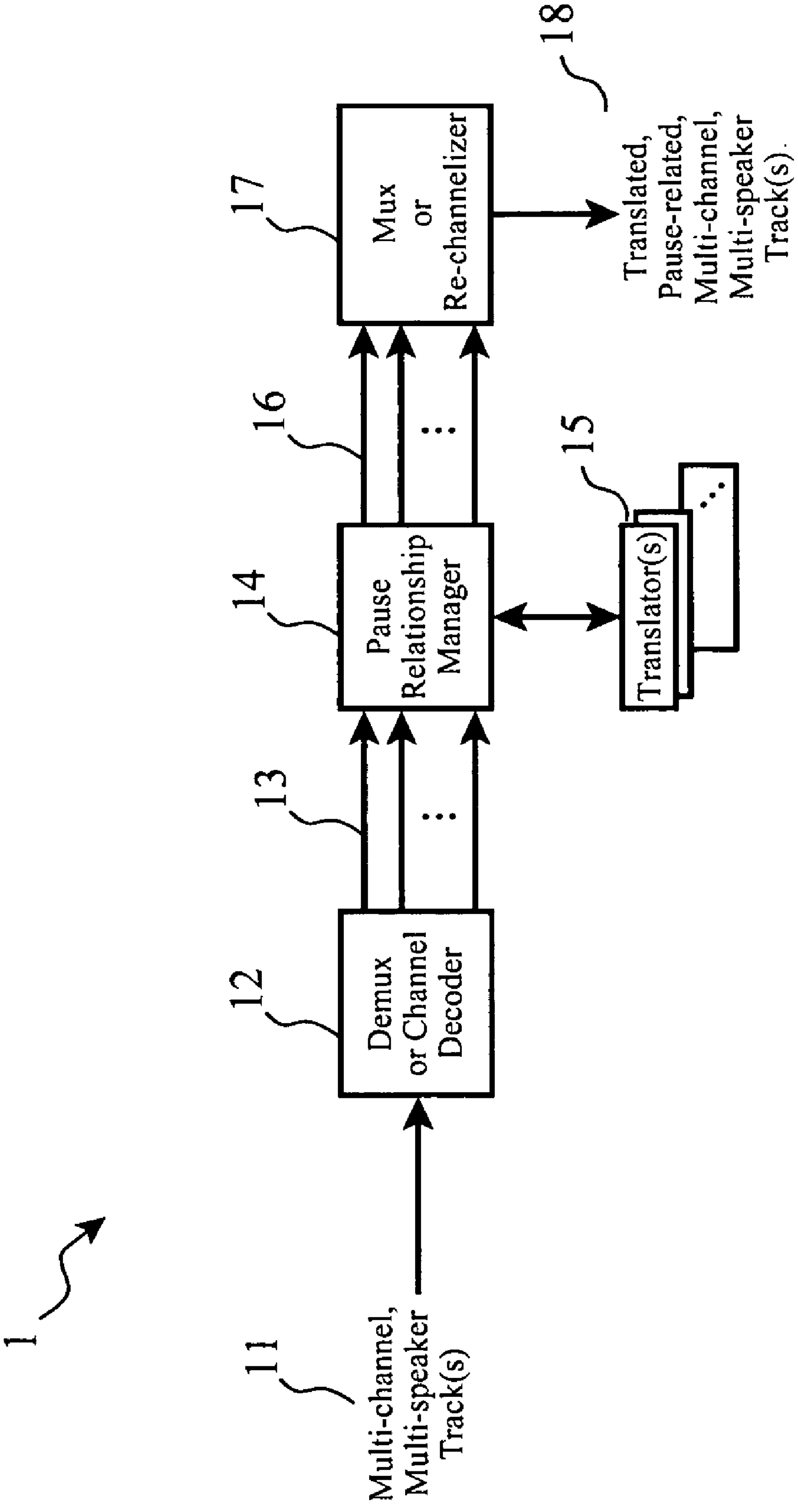
FIG. 1 depicts a general system architecture according to the present invention.

The inventors of the present invention have recognized a problem unaddressed in the art regarding multi-speaker conversations, such as conference calls or open discussion sessions of a United Nation plenary session, which are much more difficult to translate than single-speaker audio sessions. One such difficult aspect is to translate, or to maintain in translation, the time relationship between simultaneous speakers. For example, if a first speaker, speaking in English, is interrupted by a second speaker, possibly speaking in English or another language, the time relationship between the meaning of the first speaker's speech and the interruption of the second speaker is relevant and information-bearing to other listeners. If a translation loses such time relationship, the meaning of the interruption may also be lost, or seriously diminished.

An individual attempting to provide a translated version of a conversation in which multiple people are speaking at the same time, may find it difficult to provide a realistic and timely translation. Multiple translators working in unison or concert to provide a translation for multiple simultaneous speakers can be expensive and ineffective.

To address these unrecognized problems in the art, various embodiments of the invention manage multiple speaker cadence for translated conversations by separating a multi-speaker audio stream into single-speaker audio tracks containing one or more first language audio snippets organized according to a timing relationship as related in the multi-speaker audio stream, generating a pause relationship model by determining time relationships between the single-speaker snippets and assigning pause marker values denoting the each beginning and each ending of each mutual silence pause, collecting a translated language audio track corresponding to each single-speaker track, generating pause relationship controls according the pause relationship model, and producing a translated multi-speaker audio output including the translated tracks in which the translated snippets are related in time according to the pause relationship controls.

DETAILED DESCRIPTION OF THE INVENTION

The inventors have recognized that the cadence of a multi-speaker conversation is often adversely affected by translation because certain languages take more time or less time to convey ideas or dialog than others. Such multi-speaker translations are often produced in a manner in which the original cadence, or timing between speaker interchanges, is lost or distorted.

Scenarios such as the aforementioned United Nations Plenary sessions, as well as other scenarios such as rapid, automated translation of online broadcasts, and online downloadable programs, such as "podcasts", multimedia presentations, and the like. Still other scenarios to which the invention may be applied include talk shows, news interviews, breaking news coverage, sporting event broadcasts, financial trading coverage, election coverage, in live, recorded or tape delayed formats.

Based on these discoveries, the inventors have developed the following logical processes, systems, services, and computer-readable media to solve these unrecognized problems in the art.

The present invention utilizes a new Pause Relationship Model to facilitate translated audio tracks with its associate properties. During conversations, meetings, or conferences, there often is more than one speaker speaking at a given time. The present invention allows multiple audio sources to be analyzed in conjunction with translators to produce translated conversation tracks which are related to each other in a pause and time model, despite phrase length variations due to language differences, which is close to the original conversation timing.

The relationships between audio sources are captured in order to produce the desired translated audio with the corresponding timing properties, and embodiments of the invention support real-time or live translation, as well as non-realtime, or post translations.

Audio Sources and Types

There are many sources and types of audio in which multiple-speaker conversations are recorded, transmitted or broadcast, some of which are digital, and others which are analog in form. For the purposes of greater understanding by the reader, and to illustrate that the present invention may be used with any type of audio source type, we first turn our attention to a brief summary of several types of audio sources. It will be recognized by those skilled in the art that the invention may be applied to other types of audio sources not specifically discussed herein.

There are several types of digital audio computer file formats in use today. IBM and Microsoft created the "WAVE" file format which has become a standard personal computer audio file format, from system and game sounds, to CD-quality audio. WAV is a variant of the Resource Interchange File Format ("RIFF"), which is a generic meta-format for storing data in tagged chunks. A WAVE file uses the ".wav" file extension format, usually. WAVE file format also allows storage of information about the file's number of tracks (mono or stereo), sample rate and bit depth. Although a WAV file can hold audio compressed with any coder-decoder ("CODEC"), the most commonly used format is still the Pulse Code Modulation ("PCM") audio data. Because PCM uses an uncompressed, lossless storage method, which keeps all the audio track samples, audio experts can use the WAVE format for maximum audio quality. WAVE files can be edited and manipulated using respective software with relative ease. WAVE files can contain between 1 and 65,535 channels, organized into "chunks".

The Motion Pictures Engineering Group ("MPEG") as defined another popular audio file format know as MP Audio Layer-3 ("MP3"). This is a compressed audio format that represents the PCM audio data in a smaller size by eliminating portions that are considered less important to the human hearing. MP3 uses various techniques to determine which parts of the audio can be discarded without dramatically impacting the original audio. Compression can be done using different bit rates, which enables a range of tradeoffs between data size and sound quality. Like WAVE files, MP3 files can contain multiple audio channels for a single audio recording.

Other well known digital audio file formats include Microsoft's Windows Media Audio ("WMA"), and Apple's Advanced Audio Coding ("AAC").

Internet-based telephony and teleconferencing is becoming much more popular, as well, which uses another digital audio format refereed to as Voice over Internet Protocol ("VOIP"). VOIP is a new way to translate analog audio signals into digital data format so the information can be transmitted over the Internet using packet-based switching and routing. There are several types of CODECS used by VOIP, including CCITT/ITU G.711, G.729A, G729AB, G.728, G.726 G.723.1, and G.722.

One well known analog audio recording format was developed by the Society for Motion Pictures and Television Engineers ("SMPTE"). The SMPTE analog recording format includes a time code standard which allows for labeling of individual frames of video or file. These time codes are then added to film, video, or audio material in order to achieve synchronization between film frames (or video frames) and the audio tracks. Another standard defined by SMPTE is the Material eXchange Format ("MXF"), which is a container format for professional digital video and audio media. This wrapper format supports a variety of CODECs along with meta data wrapper which describes the materials contained within the MXF file.

The foregoing list of audio formats is not exhaustive, of course, as there are literally hundreds of "standard" formats, and even more proprietary formats, available for use with the present invention.

System Architecture

Turning to FIG. 1, a generalized system architecture (1) according to the invention is shown. In general, a system according to the invention creates a timing relationship model between the phrases and interrupts of a multi-speaker conversation. As such, in some embodiments, this model may have to be generated prior to any channel demultiplexing, as demultiplexing of some types of audio source data may loose the original timing relationships between the interrupts and phrases. In other embodiments, it may be possible to demultiplex channels while retaining timing relationship information. In either case, it is envisioned that generation of the timing relationship model is accomplished prior to or concurrent with translation of audio portions, while in some other embodiments, this may be accomplished in alternate order (e.g. the original language source would need to be retained for analysis after translation in order to re-organize the timing of the translated audio portions).

As such, the relationship model generated by the invention is based on the relationships in time that the phrases and interrupts have between each other in the original or primary language, with less relevancy to timing of the actual pauses. Generally, the pauses serve to help the invention identify the phrases and interrupts on each channel.

Multiple audio sources (11), each representing live or recorded audio for a single speaker, are received in a variety of formats, such as a WAV file containing a channel or track for each speaker. The audio sources can either be in analog format, such as tape or continuous electronic signal from a microphone, or a digital format, such as a WAV file.

The audio sources (11) are input into a demultiplexer or channel decoder (12) to be separated into tracks which can be processed individually, while retaining time relationships between the simultaneous or synchronized tracks or channels. For example, if an audio source has 16 audio tracks for 16 speakers, the demultiplexer or channel decoder separates the 16 audio channels into 16 individual audio tracks.

The separated audio tracks are received by the Pause Relationship Manager ("PRM") (14), which performs signal analysis and timing analysis on the audio in order to determine the relationships between pauses in the tracks.

In addition, the PRM coordinates the translation of each audio track into one or more target language, using automated translators, semi-automated translators, manual translators, or a combination of translators types (15).

The translated tracks are then organized into a pause relationship model by the PRM (14) based upon the original pause relationship model of the untranslated tracks. Finally, translated channels, typically grouped by target language but alternately grouped according to other schemes, are multiplexed or channelized into a desired target format, such as into a multi-channel WAV file or into a mixed analog signal.

Pause Detection

For the purposes of this disclosure, we will refer to a "pause" as a period of time in which no speaker is speaking. Logically, this means that no words or phrases are being recorded, have been recorded, are being transmitted, etc., during the pause. In practice, there may be other signals or noise in a track during a pause, such as background noise, crowd sounds, music, etc. So, use of conventional means for detecting foreground voice signals, including conventional voice-band filters and convention adaptive threshold detectors, are preferably used to analyze each audio track to identify periods of speaker silence, mutual pauses, and talking or discussion.

Translation Systems and Audio Sources

The present invention preferably utilizes one or more translation sources, such as:

(a) live translators (e.g. human translators) who are equipped with audio listening devices (e.g. speakers, headphones, etc.), and audio capture devices (e.g. microphones, PC with sound cards, etc.); and/or (b) semi-automated and automated translation systems, such a computer-based and on-demand translation services, such that their spoken or audible translations are rendered into an electronic format suitable for organization into a pause relationship model by the PRM.

The following paragraphs describe a few such translation resources which may be utilized from available technologies. It will be understood by those skilled in the art that other translation resources not mentioned here may utilized with the invention, as well.

The SRI Phraselator. The SRI Phraselator is a product developed by SRI International, an independent, nonprofit research institute conducting client-sponsored research and development projects for various organizations. SRI has developed a speech-to-speech ("S2S") translation system that offers an immediate international communication ability without the requirement of extensive training or reliance on human linguists. The phraselator is a handheld device that enables unidirectional translation from English to another language. Currently, the developed translation is between English and Pashto, a major language of Afghanistan. The user simply speaks or selects from a menu, an utterance from among 500 to 1000 pre-translated English phrases stored in the Phraselator. These phrases are stored in individual plug-in modules which can be swapped easily depending on the target language and intended domain. Therefore, adding a new language is easy, requiring only oral translation and recordings and can be saved on flash memory card. The prerecorded translation of the input utterance is then played through a built-in high fidelity speaker. In addition, the user has the option to utilize the verification mode which allows the translated phrase be first recognized before it is being played vocally. Another feature of the Phraselator is that it has word spotting capability which enables the system to quickly find the appropriate phrase for translation. This provides the user fast response time which enhances the real-time experiences. Primarily, the Phraselator has been used in military exercises and deployed to US troops in Afghanistan in early 2002 and to Iraq in 2003.

IBM MASTOR. International Business Machines Corp. ("IBM") developed their Multilingual Automatic Speech-to-Speech Translator ("MASTOR") system in 2001. This was the first S2S system that enabled bi-directional free-form speech input and output translation of English and Mandarin. Currently, it contains over 30,000 free form speech input vocabulary for both directions in various domains such as travel, emergency medical diagnosis and defense-oriented force protection and security. MASTOR can be run in real-time on a laptop or be loaded into a portable handheld PDA with minimal performance degradation. IBM used MASTOR in one of its client projects, Danbury Hospital, which facilitated better communication between health care professionals and its non-English speaking patients.

The goal of the MASTOR project is to use mathematical models and natural-language processing techniques to make computerized translation more accurate, efficient, and adaptable to different languages as well. Currently, there are existing commercial systems that translate web documents word by word or can only be utilized in specific context such as travel planning. MASTOR uses semantic analysis, which extracts the most likely meaning of text or speech, stores it in terms of concept like actions and needs, and then express the same idea in another language. The combination approach of using semantic analysis with statistical algorithms allows computers to learn the translation patterns by comparing streams of text with translations done by humans.

PRM Pause Marker Analysis

Figure 5A:
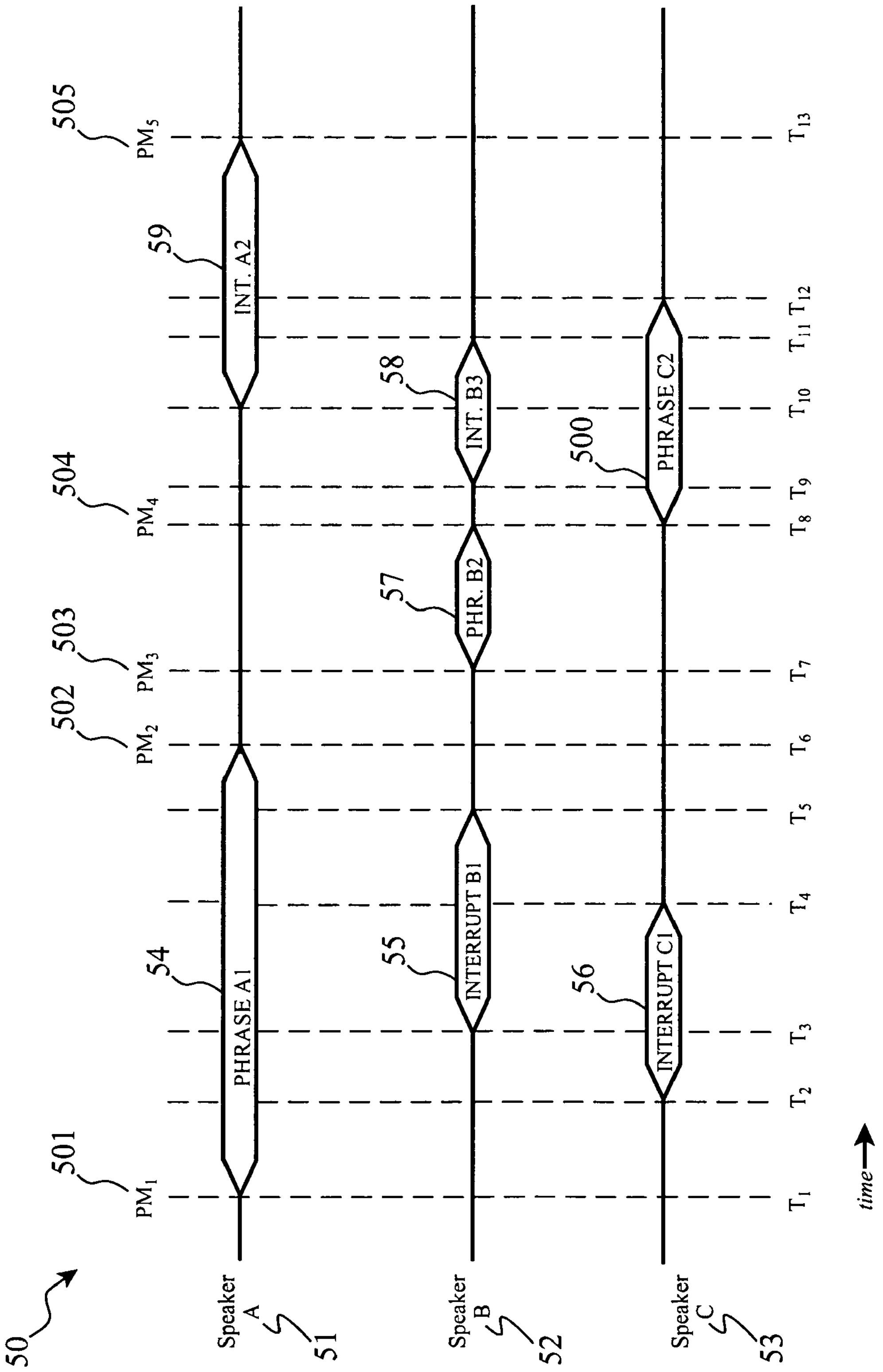
FIG. 5*a* illustrates a sample of discussion between three speakers spoken in English in the original spoken dialect.

FIG. 5*a* illustrates a sample of discussion timeline (50) between three speakers (51, 52, 53), in this example spoken in English. The audio for each speaker is presumably on a separate track or channel in the audio source, such as on a separate carrier frequency, in a separate digital audio track, or on a separate analog signal.

During this example discussion, initially Speaker A talks first by beginning to speak phrase A1 (54) at time $T_1$. Speaker C, however, interrupts Speaker A, by beginning to speak interruption C1 (56) at time $T_2$, and subsequently, Speaker B also interrupts Speaker A, by beginning to speak interruption B1 (55) at time $T_3$. Speaker A, however, continues speaking phrase A1 until time $T_6$. Then, there is a period of silence while no one speaks, from time $T_6$ until time $T_7$.

At time $T_7$, however, Speaker B begins to speak Phrase B2 (57) finishing that phrase at time $T_8$, at which time Speaker C begins to speak Phrase C2 (500). During Speaker C's Phrase C2, Speaker B interrupts by speaking interrupt B3 (58) at time $T_9$, and Speaker A interrupts with interrupt A2 (59) at time $T_{10}$, as shown.

This convention of determining or designating who is the primary speaker, and who is an interrupter, follows conventional manners of English speaking societies by allowing one who starts to speak during a period of mutual silence to complete his or her phrase (e.g. "having the floor"), and by designating those who speak during someone else's "floor-time" as an interrupter.

This convention is adopted in this disclosure for ease of explanation, but the terms afforded to each speaker are not essential to the realization of the invention. Other terms, definitions, and designations may be adopted, as the invention pertains to the time-based pause relationship model provided by the invention. For example, in some social situations, such as in corporate meetings, it is often considered that the most senior person in the organization is allowed to speak over other, lower level person, at which time the junior party is expected to stop speaking (e.g. "yield the floor"). Similar seniority-based or hierarchy-based social customs exist in family discussion scenarios, courts with royalty, etc.

In the example of FIG. 5*a*, the invention determines that a pause exists during times of silence, and briefly when one speaker finishes but another speaker speaks almost immediately. So, in this example, a first pause marker $PM_1$ (501) is assigned to time $T_1$ because at this time all three speakers are silent and Speaker A breaks the silence. The next pause marker $PM_2$ (502) is assigned to time $T_6$ because this is when Phrase A1 is finished.

Likewise, another pause marker $PM_3$ (503) is assigned to time $T_7$ when Speaker B breaks the silence, and another pause marker $PM_4$ (504) is assigned at time $T_8$ when Speaker B finishes phrase B2, and Speaker C begins phrase C2 (500). Phrase C2 is not an interruption because Speaker B is finished before C2 is started.

The last pause marker in this example, $PM_5$ (505), is assigned to time $T_{13}$ because this is when Speaker A finishes his or her interruption A2 (59) of Speaker C's phrase C2, during which Speaker B interrupted with interruption B3 (58).

So, in this manner, the invention assigns pause markers at times in the multi-speaker conversation which meet the following criteria:

(a) each time a period of mutual silence (no speakers speaking) is broken by a speaker beginning to speak, designating the speaking party as the primary speaker (e.g. a non-interrupter);

(b) each time a primary speaker stops speaking for a considerable amount of time which would indicate culturally that the primary speaker is finished talking (this is a configurable period in the preferred embodiment), so long as no interrupter is continuing to speak;

(c) each time an interrupter stops speaking for a considerable amount of time which would indicate culturally that the interrupter is finished talking (this is a configurable period in the preferred embodiment), so long as the primary speaker has also finished speaking; and (d) each time one primary speaker yields the floor and another primary speaker takes the floor essentially with little or no pause (but no overlap in time) between their speaking.

PRM Translation Delay Management

Depending on the translation scenario, live/realtime or post translation, the PRM organizes the translation audio tracks according to one of two pause relationship models, yielding at least four pause model output possibilities.

To understand these four models, it is first useful to establish additional terminology describing the time relationships between an original or primary language audio track, and the availability of a translation audio track.

Figure 5B:
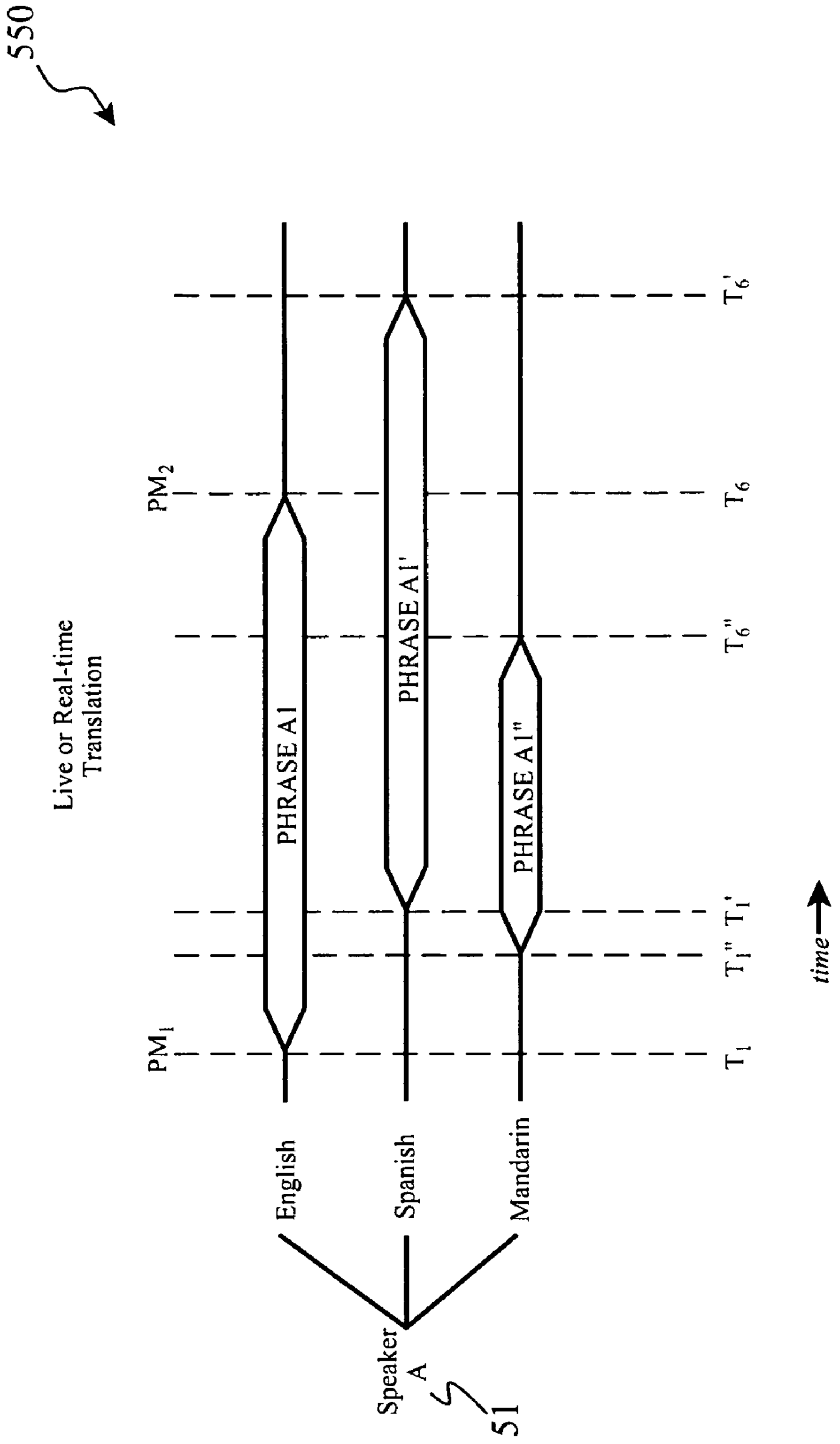
FIG. 5*b* shows a timeline diagram of a live or real-time audio translation for the first phrase spoken by Speaker A in FIG. 5*a*.

FIG. 5*b* illustrates (550) a timeline for the realtime or "live" translation of Speaker A's Phrase A1, originally in English for this example, being translated into a secondary language, Spanish, phrase A1, and into a tertiary language, Mandarin, phrase A1". This type of time relationship can occur during live meetings which are translated by human translators, or during streaming audio presentations during which automated translations are performed in realtime, for example.

First, it should be noticed that there is a delay between the beginning of the primary language phrase A1 at time $T_1$, and the availability (e.g. the speaking of a translator or output of an automated translator) of the translated Spanish audio at time $T_1'$, and the availability of the translated Mandarin audio at time $T_1''$. Two separate delays are shown, as human translations from one language to another vary in their delay times based on the interpreter and the two languages of translation. In practice, these times may turn out to be the same, of course.

Second, it should be noticed that translated phrases may take more or less time to express (e.g. speak) than the original, untranslated phrase in the primary language. This length variation depends in part on the meaning and context of the original phrase, and in part whether or not the translation is informal (e.g. colloquial or conversational), or formal (e.g. legal translation, non-slang, non-conversational). In the example of FIG. 5*b*, we have illustrated that the Spanish translation is longer than the original English phrase, and that the Mandarin translation is shorter than the original English phrase.

Figure 5C:
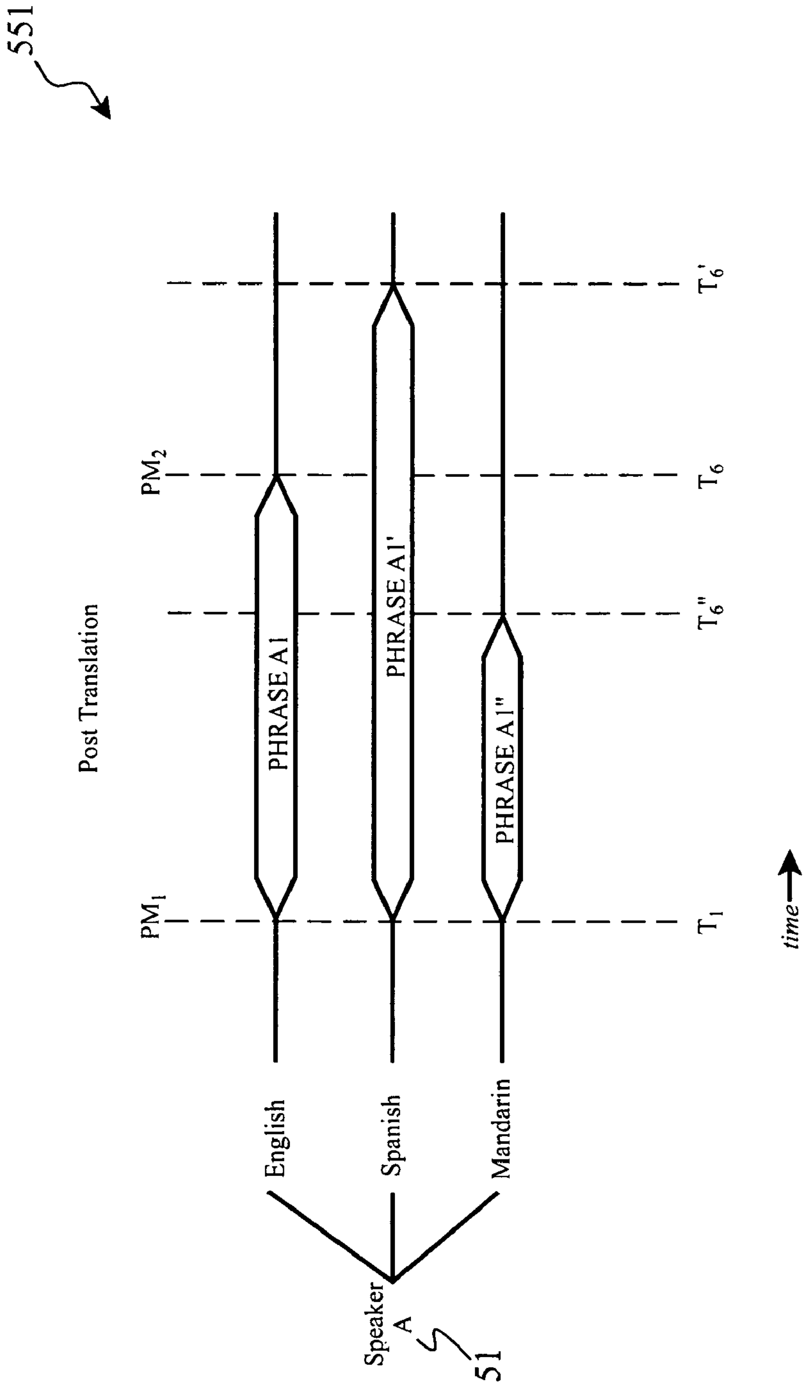
FIG. 5*c* depicts a timeline pictorial of the translation of Speaker A's first phrase from FIG. 5*a*, performed in a non-realtime translation scenario.

Turning to FIG. 5*c*, another translation scenario timeline (551) is shown, this one for translation in non-realtime, or "post" translation. Such translations may occur in situations where there is no time demand to generate translations, such as translating the audio tracks of a previously recorded conversation, a movie, or broadcast. In this situation, the rendered translation phrases and interruptions can be re-organized after translation is complete so as to allow synchronization of the start of all of the audio snippets. This is useful in certain scenarios as the audio may have time relevance to other events, such as video frames in a movie, or appearances of bullets in a presentation. As such, the PRM produces output translations having a pause relationship synchronized to the end of each mutual silence (e.g. synchronized to the beginning of each primary speaker's taking the floor).

Figure 5D:
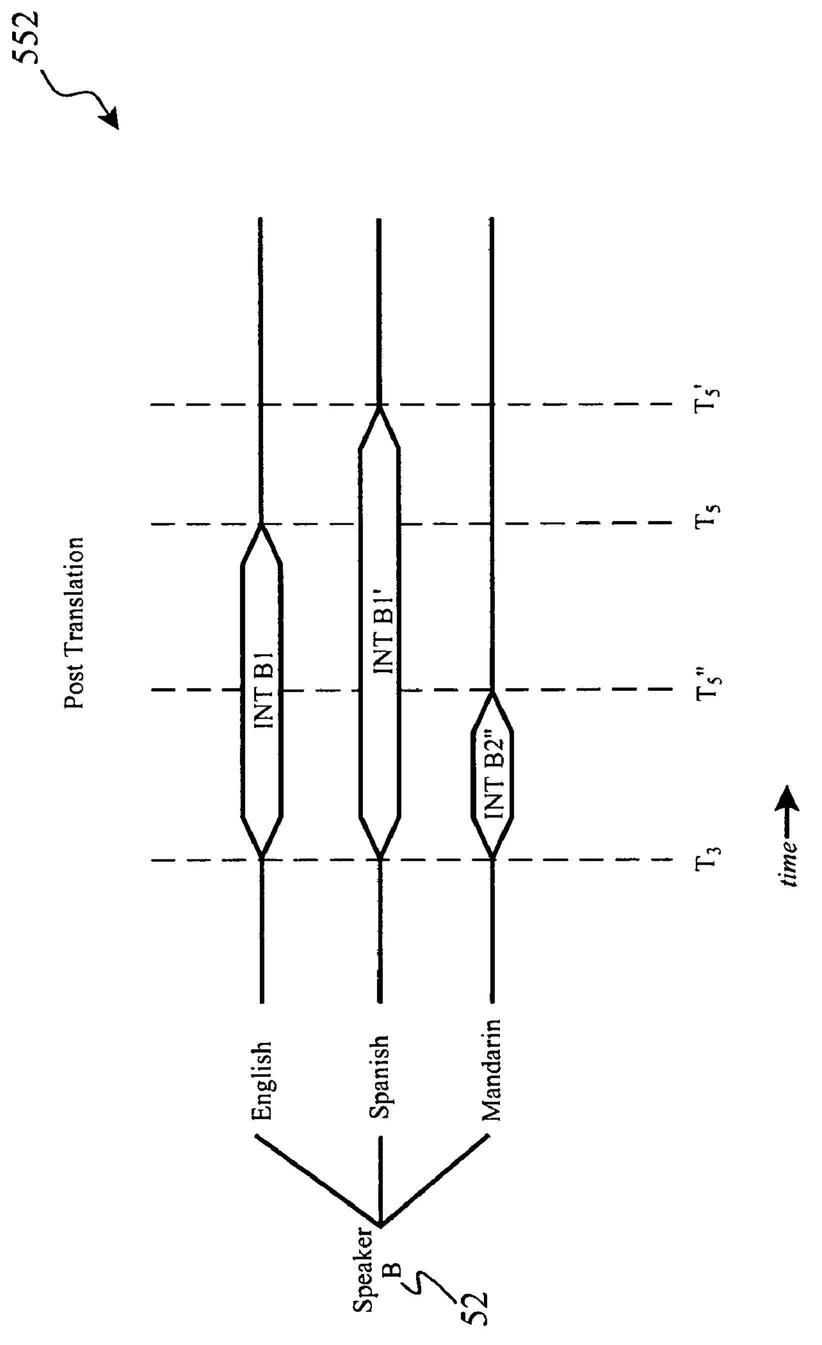
FIG. 5*d* illustrates the translation of Speaker B's interruption of the first phrase spoken by Speaker A in FIG. 5*a*.

These two types, realtime/live or post, of translation are performed for each original language audio track for each speaker in the multi-speaker conversation, for each target language, as further illustrated (552) for Speaker B in FIG. 5*d*, corresponding to the previous example. Further, the PRM manages each phrase or interruption separately.

For more general discussion, we will refer to each individual phrase or interruption in an audio track interchangeably as an audio "snippet" or "chunk". The later term being consistent with terminology employed in the file format definition of a WAV file, while the former term is less specific to WAV files.

Track Demultiplexing and Remultiplexing

Figure 6:
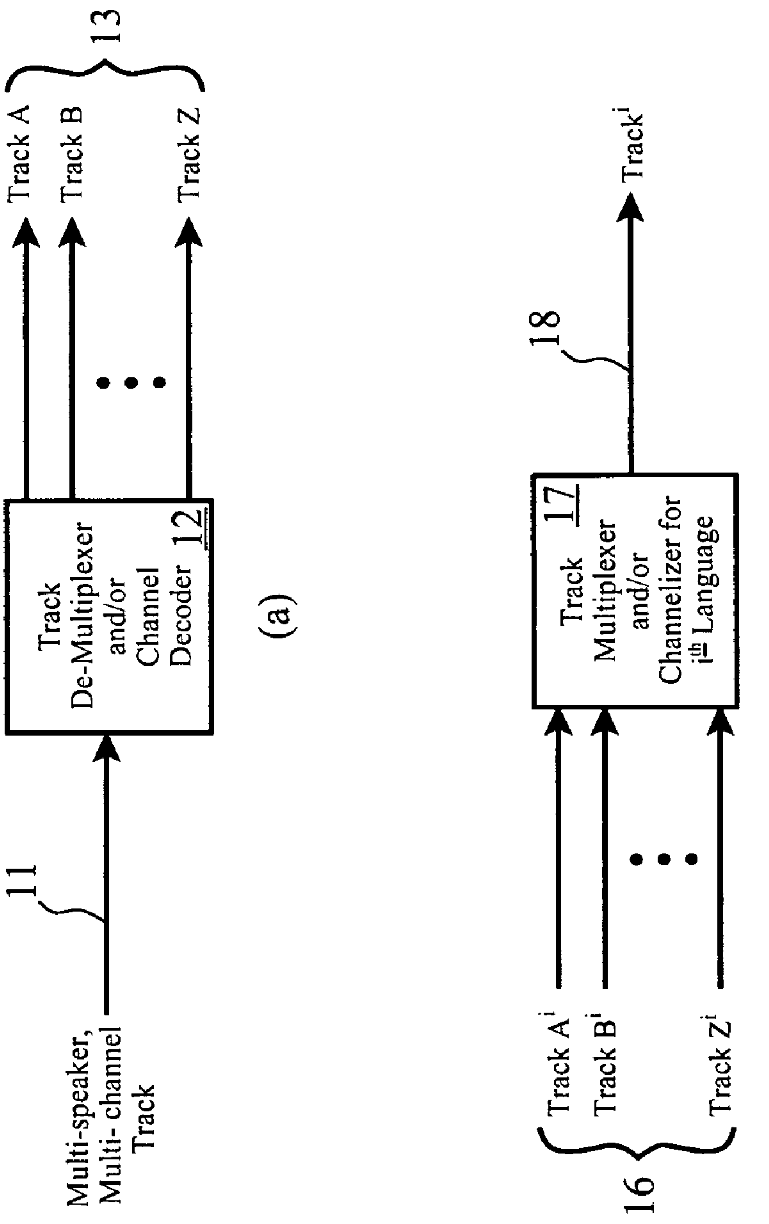
FIG. 6 describes the operations of demultiplexing channels for each speaker, and then re-multiplexing translated audio channels for each speaker, in a multi-speaker conversation.

FIG. 6 shows more functional details of the track demultiplexing and re-multiplexing, according to the invention. A demultiplexer (12) which is adapted to the particular type of input multi-speaker audio source (11) separates the audio source into one or more single-speaker tracks (13), each of which are expressed in a primary or original language.

After translation and time re-organization (e.g. pause relationship management) of the chunks or snippets of the individual tracks by the PRM, a multiplexer (17) is optionally employed to multiplex or channelize the individual translated tracks (16) into a translated multi-speaker audio format (18) expressed in a target language.

For reference purposes, this disclosure will use prime marks to indicate primary language (no prime), secondard language (one prime mark), tertiary language (two prime marks), and so on, including an $i^{th}$ language (superscript i). For our previous example, the primary language was English, the secondary language Track' was Spanish, and the tertiary language Track" was Mandarin. So, for example, Track A (no prime mark) output from the demultiplexer (12) represents Speaker A's audio in the primary language, while Track A' input to the demultiplexer represents Speaker A's audio translated into the secondary language (e.g. Spanish in our example).

The demultiplexer and multiplexer are preferrably adapted or configured according to the application of the invention. For example, if a multi-speaker WAV file is to be received, translated, and output, then both the multiplexer and the demultiplexer would be adapted to extract and recombine the speaker tracks and time codes according to the WAV file format definitions.

Further, in some applications, the input format may be different from the output formats, so the demultiplexer may be adapted to extract speaker tracks according to a first format or protocol, while the multiplexer may be adapted to recombine the translated tracks into a second format or protocol. For example, the invention may receive and demultiplex SMPTE files, but produce translations in MP3 format.

PRM Translation and Pause Management

The Pause Relationship Manager ("PRM") receives the individual speaker tracks from the demultiplexer, manages the translation of the snippets or chunks of audio in each speaker track into one or more languages, and creates the timing relationships of the combined, translated outputs.

Figure 7:
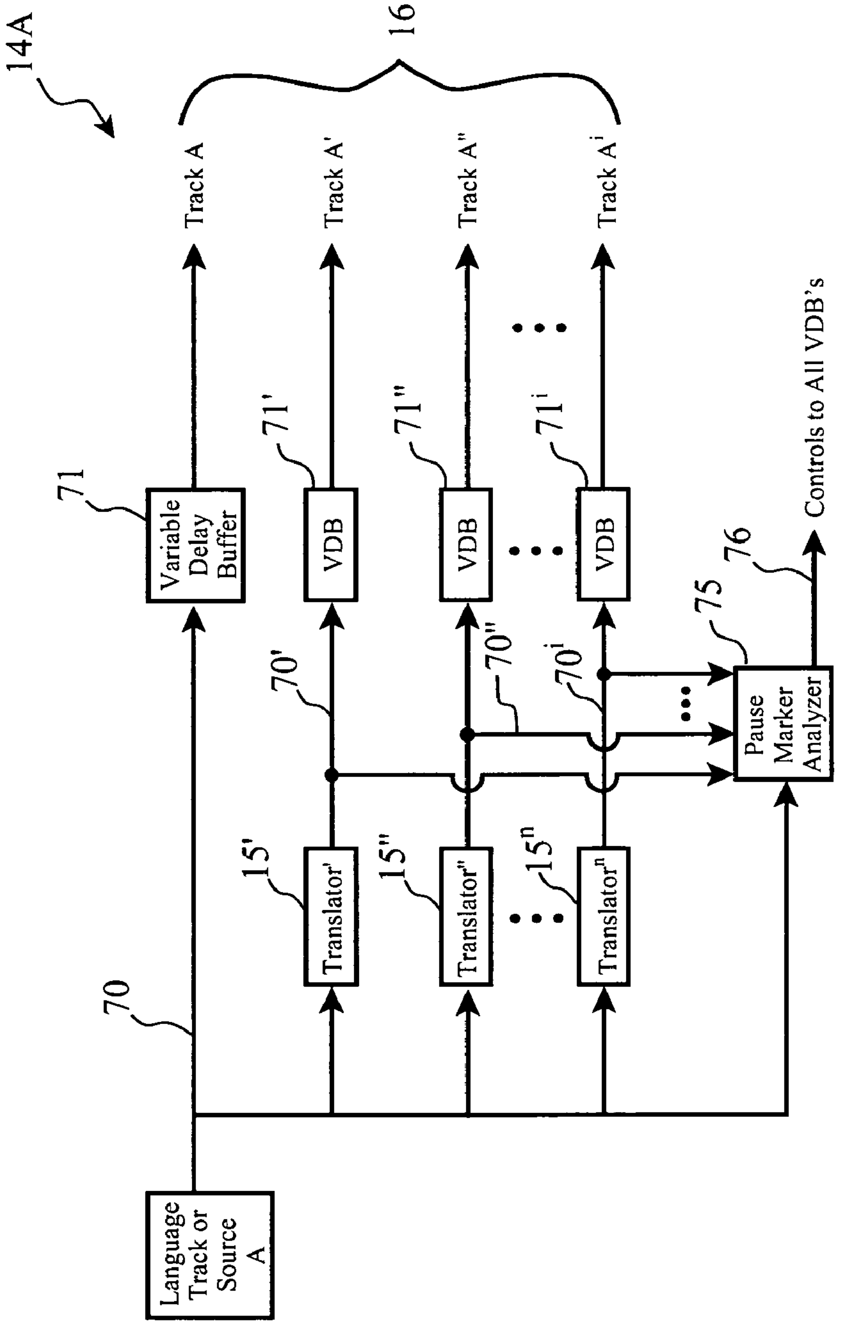
FIG. 7 represents the system functions or logical processes of our Pause Relationship Manager relative to translation of a first speaker's audio.

FIG. 7 shows a functional diagram of a system according to the present invention which utilizes variable delay buffers ("VDB") (71, 71', 71" . . . 71$^i$) to achieve time relationships according to a transformation of the original pause relationship model of the audio chunks in the primary language tracks. This particular realization is suitable for both realtime and post translation modes, as previously discussed.

FIG. 7 shows (14A) a set of functions for processing the audio from Speaker A, such that the original track (70) is transmitted to one or more translators (15', 15", . . . 15$^i$), which then produce, either in realtime or post processing time, translated chunks (70', 70", . . . 70$^i$). These translated chunks are then delayed by variable delay buffers (71, 71', 71" . . . 71$^i$) under the control (76) of the pause marker analyzer (75) to achieve translated tracks in each language (16) in which the snippets have a pause-time relationship to the original track (70).

Figure 8:
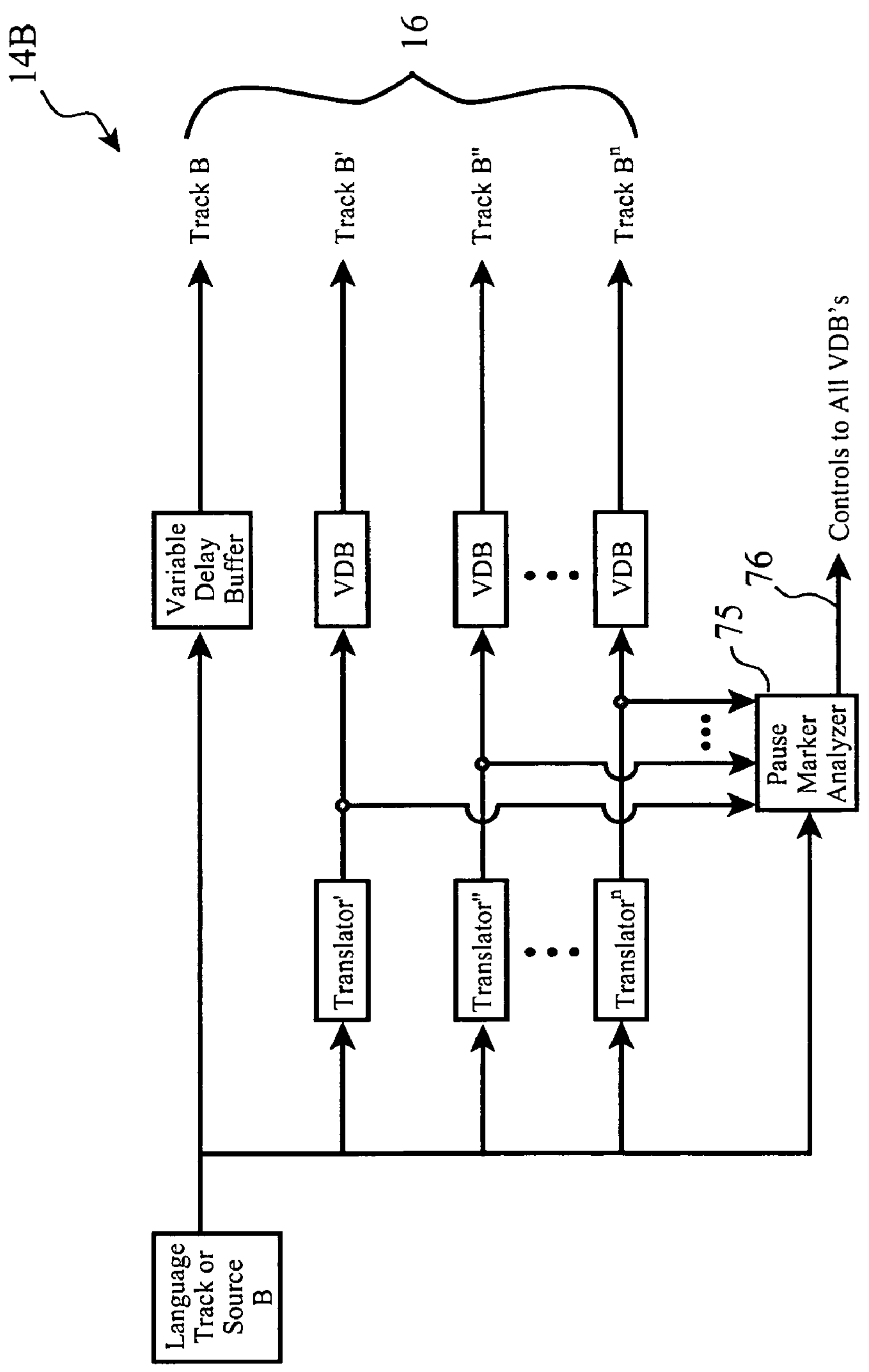
FIG. 8 illustrates Pause Relationship Manager operation for a second speaker, corresponding to the functions and processes of FIG. 7.
Figure 9:
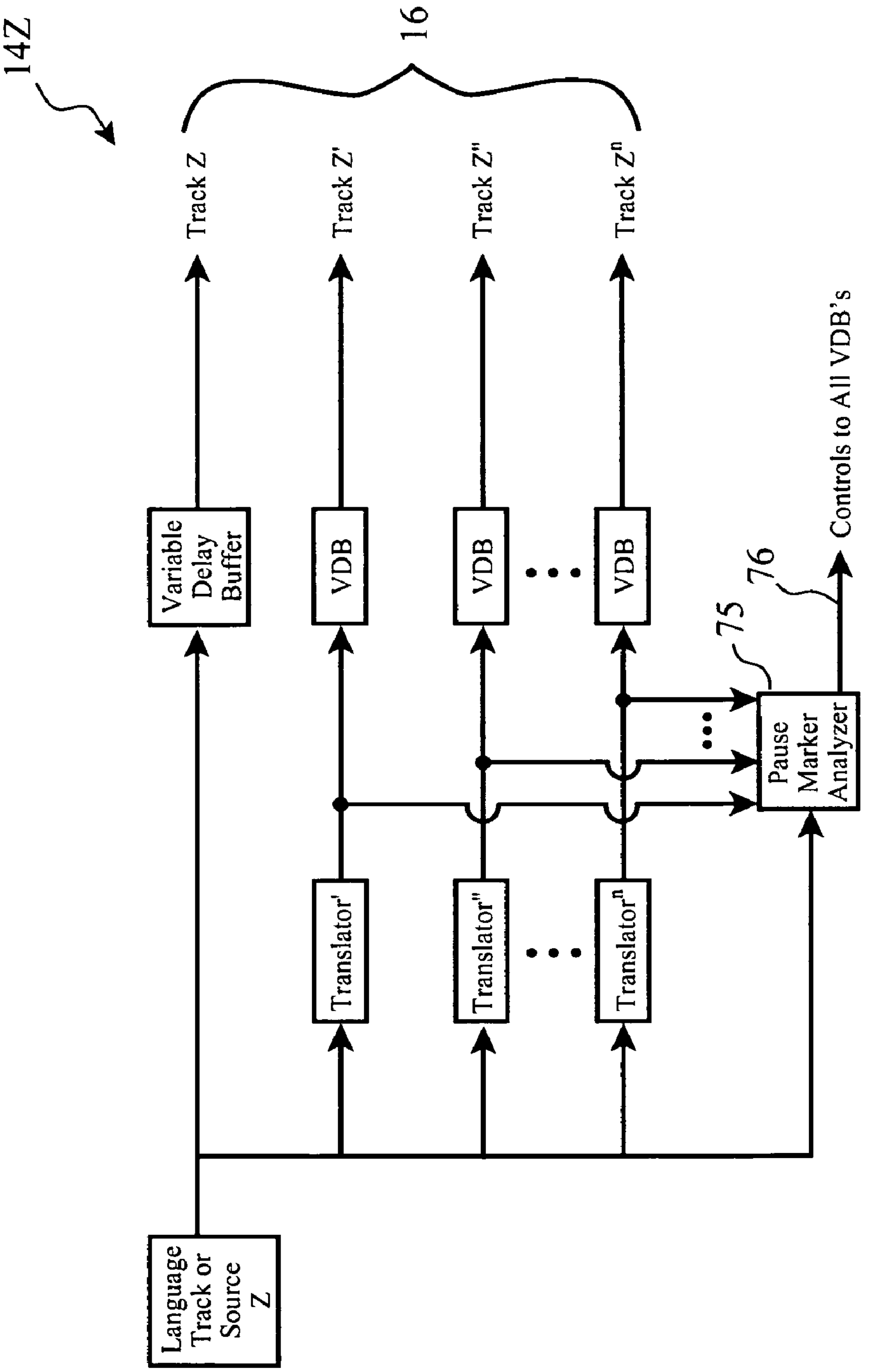
FIG. 9 illustrates Pause Relationship Manager operation for a $Z^{th}$ speaker, corresponding to the functions and processes of FIG. 7.

FIG. 8 shows how a similar arrangement (14B) of functions can be employed to translate and time-relate a second speaker's audio source, and FIG. 9 shows in a generalized arrangement (14Z) the functions for handling a $Z^{th}$ audio source (e.g. for a $Z^{th}$ speaker in the multi-speaker conversation).

In realization, the functionality of FIGS. 7, 8, and 9 may be committed to silicon in an integrated circuit, such that processing of audio tracks is truely done in "parallel" or simultaneously. Alternatively, it may be implemented in part or whole by software being executed by one or more microprocessors, such that some or all of the processing of audio information is done in series.

Pause Relationship Models

The present invention is capable of managing four or more pause relationship models, as summarized in FIG. 10*a* for a first translation language (e.g. for a secondary language). There are two modes of timing placements of interrupts during a phrase (e.g. "interpause" timing relationship) (1001), and there are two sub-modes (1002) within each of these modes determining whether or not the output translated snippets are to be synchronized to the beginnings of the primary language snippets, or are to be positioned within each interpause period according to the major mode (1001) of operation. The timing determinations are illustrated by the equations (1003) for the secondary language shown, relative to the previously described example of FIGS. 5*a*-5*d*.

For example, in absolute timing mode, the delay from the start of a translated phrase to the start of a translated interruption is to remain the same time value. Assume that $T_3-T_1$ in FIG. 5*a* is 18 seconds, then the delay between starting the translated interruption B1' and starting the translated phrase A1' after $PM_1$ (e.g. $T_3'-T_1'$ where $T_1'=PM_1'$) should also be 18 seconds, as shown in Eq. 1 of FIG. 10*a*. In a realtime translation scenario, there is typically some delay between the start of an original language phrase $PM_1$, and the start of the same phrase in a translation $PM_1'$, as previously discussed, and as shown in Eq. 2.

If, however, in a post processing scenario the translated phrase A1' and the original language phrase A1 are to be synchronized to each other (e.g. they will start at the same time in the output tracks), such as shown in the example of FIG. 5*c*, then $T_1'=T_1=PM_1$ (Eq. 4), so the translated interruption B1' is started at 18 seconds after $PM_1$, as shown in Eq. 5.

Now, instead, consider the alternate interpause relationship model, in which the translated interruption snippets are placed at a relative position within the phrases so that they retain a proportional relationship. For example, consider a scenario where Speaker B interrupts Speaker A about one-third of the way into Speaker A's phrase. This may have occurred because Speaker B was reacting to the meaning or context of Speaker A's phrase at about this time. This timing relationship is important to maintain, as it conveys information to an observer of the whole conversation. Consider this conversation flow, during which Speaker A states the phrase:

A: I like chocolate cake, but it is difficult to lose weight if it is in my diet.

If, for example, Speaker B interrupts about one-third of the way through the phrase, as such:

A: I like chocolate cake, but it is difficult to lose weight if it is in my diet.

B: ———^ No way!

where Speaker B is reacting to the thought of liking chocolate cake, there is meaning conveyed in the timing between the two snippets that Speaker B disagrees with the statement of liking chocolate cake.

If, however, the translated interruption is positioned later relative to the start of the translated phrase, as such:

A: I like chocolate cake, but it is difficult to lose weight if it is in my diet.

B: ——————^ No way!

In this modified timing relationship, the positioning of the interruption imports a different meaning that Speaker B disagrees with the statement that chocolate cake is detrimental to a weight loss plan.

So, based upon a generalization that although a translated phrase may be longer or shorter than the original language phrase, but that information flows in the translated phrase somewhat linearly or evenly throughout the translated phrase, a proportionally positioned relative to the start of the translated phrase may retain the original meaning of the interchange more accurately.

For example, if the example phrase of Speakers A and the interruption of Speaker B are translated into Spanish, and the interruption is placed about one-third of the way through the translated phrase, the approximate relationship is produced as follows:

A: Quiero bizcocho de chocolate, pero soy dificil de adelgazar comerlo.

B: ———^ No, yo no convengo!

(Note: Informally Translated by http://www.babelfish-.com)

In this manner, the approximate relationship conveys that Speaker B disagrees with the statement regarding liking chocolate cake.

To achieve this proportional or relative relationship between phrases and interruptions, the starting time of the interruption is determined by first determining a percentage or proportion of the original phrase where the original language interruption occurred (e.g. one-third of the way through in the previous example). The PRM determines the proportion of time of the original language phrase which transpired before the interruption occurred, such as $(T_3-T_1)$ divided by the length of the phrase $PM_2-PM_1$ shown (Eq. 5). Then, the starting time of the translated interruption $T_3'$ is determined by adding an offset to the starting time of the translated phrase, $T_1'$ in this example, where the offset is the determined proportion multiplied by the length of the translated phrase, $PM_2'-PM_1'$ in this example. In this realtime or live translation scenario, the start time $T_1'$ of the translated phrase typically occurs with some delay relative to the start time $T_1$ of the original (untranslated) phrase (Eq. 6).

If the translation scenario is a post processing situation, then the translated phrase and the original phrase are output such that they start at the same time, $T_1'=T_1=PM_1$ (Eq. 8). In this scenario, the calculations of Eq. 5 are modified to add the offset to $PM_1$ instead of $PM_1'$ (Eq. 7).

FIG. 10*b* illustrates (1004) generalized calculations for an $i^{th}$ language (1005) according to the example secondary language calculations (1003) shown in FIG. 10*a*.

Figure 11A:
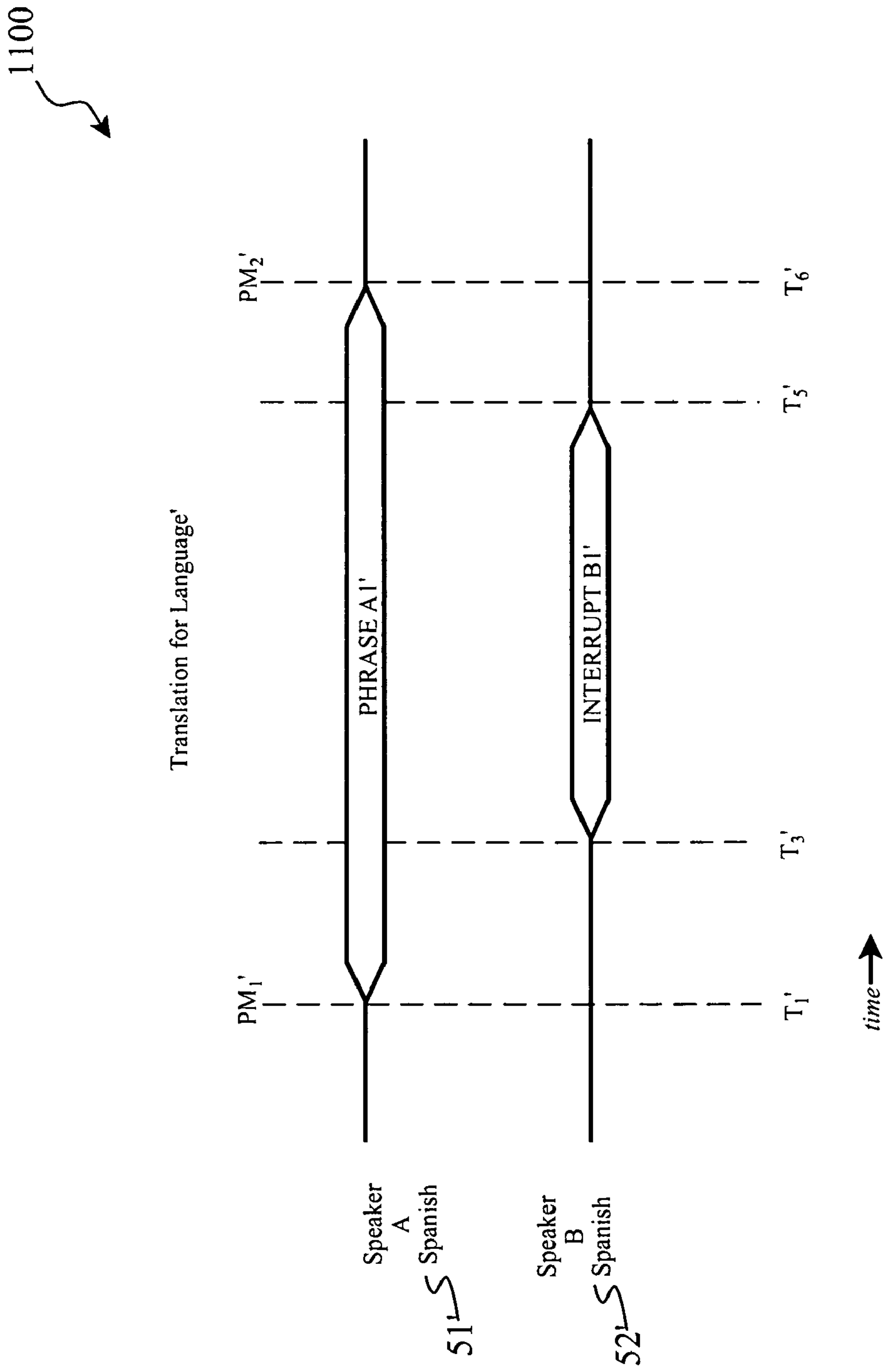
FIG. 11*a* illustrates the timing related to conversational pauses of two speakers' translated audio as produced by the invention.
Figure 11B:
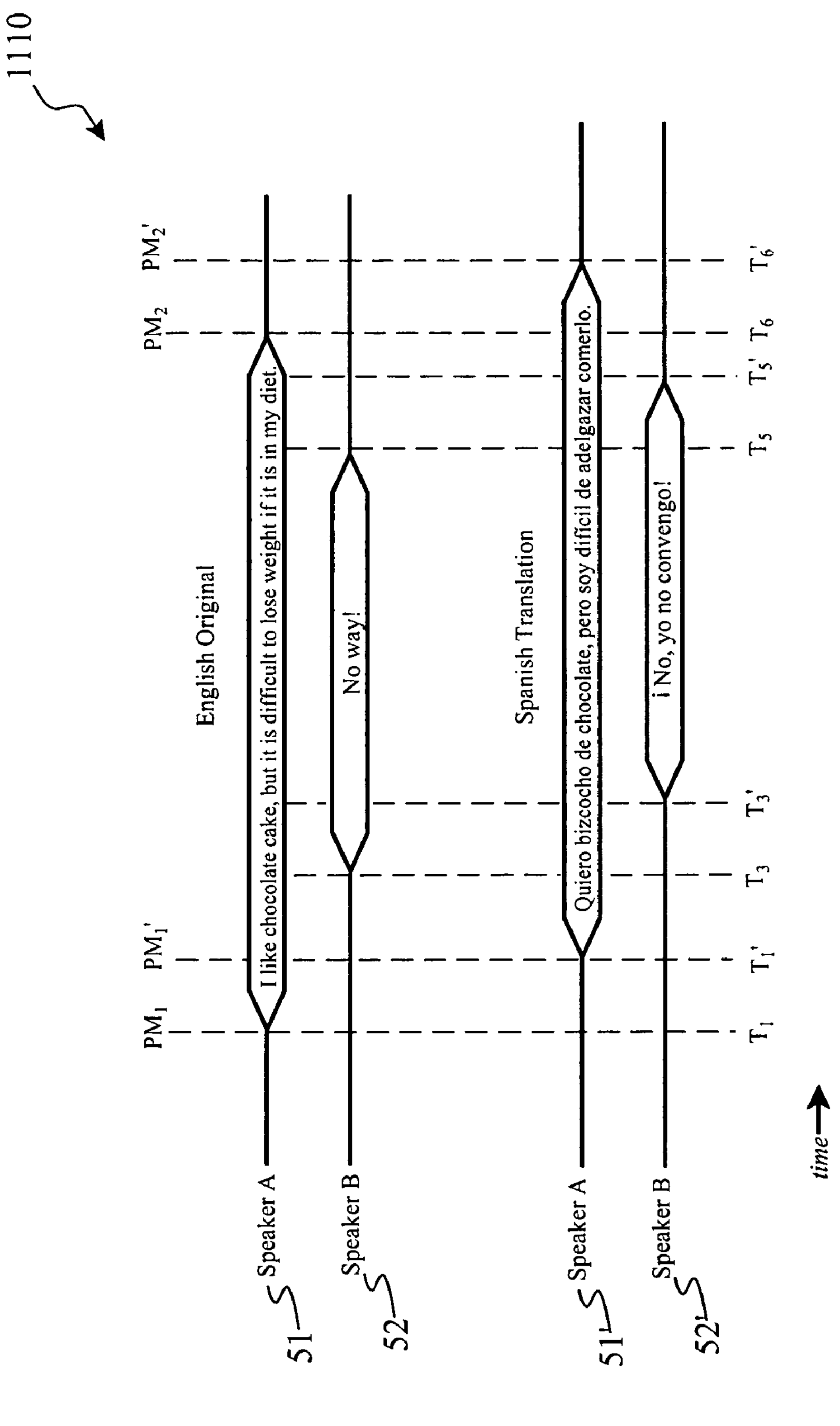
FIG. 11*b* illustrates the timing relationship between an original language interchange and the translated language interchange as produced by the invention.

FIG. 11*a* illustrates, in general, the final relationship (1100) between the translated phrase A1' for Speaker A in Spanish (51'), and the pause-related timing of the start of the translated interruption B1' for Speaker B in Spanish (52'), wherein the start time of Spanish phrase A1' is $T_1'$, and the start time of Spanish interruption B1' is $T_3'$. The actual time or delay between times $T_1'$ and $T_3'$ is determined by the foregoing processes and calculations. FIG. 11*b* provides an illustration (1110) specific to the previous example, relating the translations to the original tracks, as well.

Time-Scale Modification with Pitch Maintenance

There are several processes available in the art which allow sampled signals, such as voice recordings, to be modified to have a longer or shorter duration than the original signal, without changing the apparent pitch or tone of the signal (e.g. without causing the voice to sound deeper or higher pitched). Several well-known Internet vocoders employ such time stretching and time compressing techniques in order to counter the effects of unpredictable data rates during streaming of audio and video through the Internet. For example, if a vocoder playing back a "book on tap" over the Internet determines that it is playing data faster than it is receiving data, it can be predicted that it will run out of data and have to wait for more data from the server, thereby causing gaps and breaks in the output audio. So, the vocoder instead time stretches the data it already has received, until it begins to receive data at a faster rate from the server. The well known RealPlayer™ by RealNetworks Inc.™ employs such technology, which they refer to as bitrate scaling.

In another embodiment of the present invention, the durations of each translated snippet are processed with a time-stretching codec to yield a translated snippet having the same length of the corresponding untranslated snippet. In such an embodiment, the output pause marker relationship model is optionally exactly the same as the pause marker relationship of the original, untranslated tracks.

Suitable Computing Platform

In one embodiment of the invention, the functionality of the PRM, including the previously described logical processes, are performed in part or wholly by software executed by a computer, such as a personal computers, web servers, web browsers, or even an appropriately capable portable computing platform, such as personal digital assistant ("PDA"), web-enabled wireless telephone, or other type of personal information management ("PIM") device.

Therefore, it is useful to review a generalized architecture of a computing platform which may span the range of implementation, from a high-end web or enterprise server platform, to a personal computer, to a portable PDA or web-enabled wireless phone.

Figure 2A:
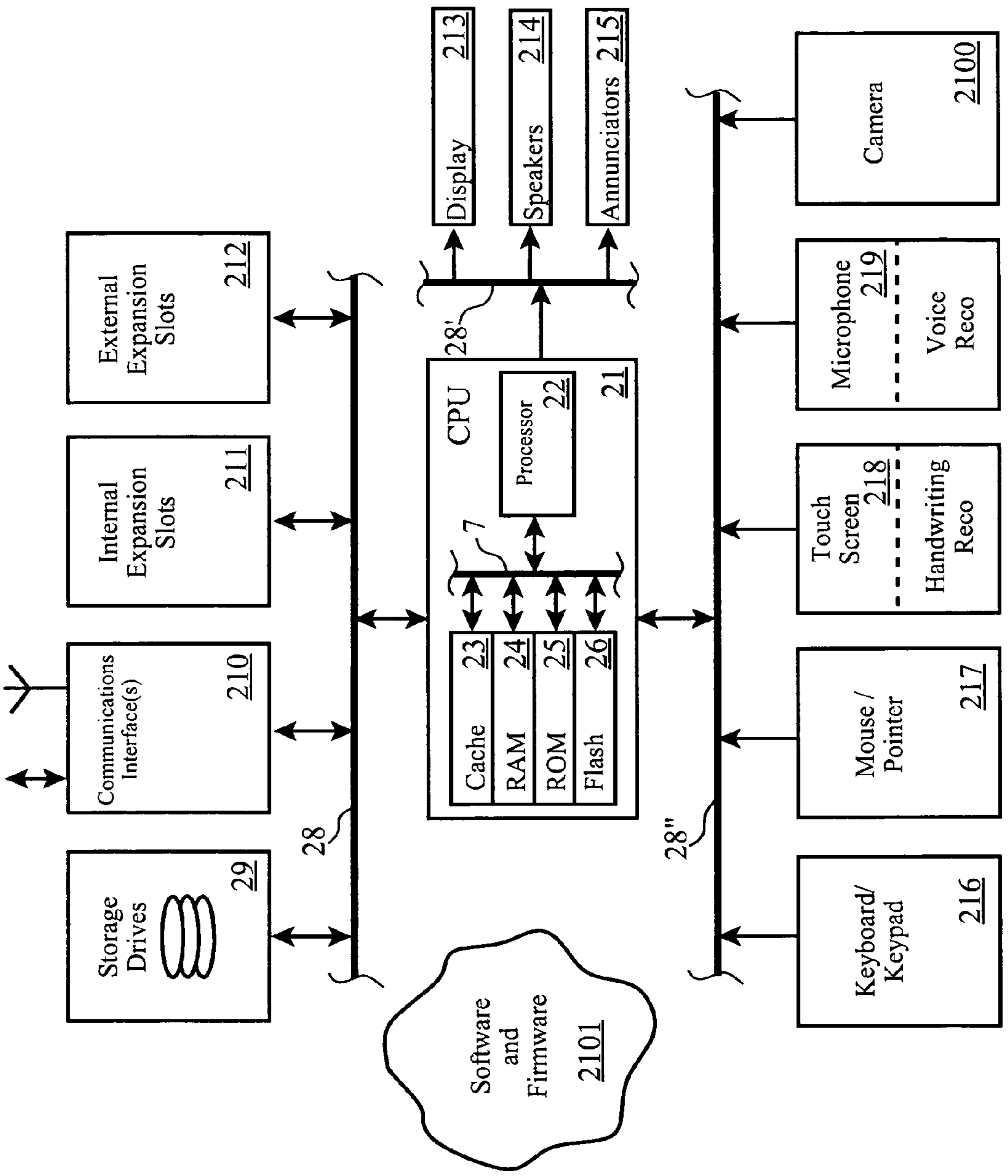
FIGS. 2*a* and 2*b* show a generalized computing platform architecture, and a generalized organization of software and firmware of such a computing platform architecture.

Turning to FIG. 2*a*, a generalized architecture is presented including a central processing unit (21) ("CPU"), which is typically comprised of a microprocessor (22) associated with random access memory ("RAM") (24) and read-only memory ("ROM") (25). Often, the CPU (21) is also provided with cache memory (23) and programmable FlashROM (26). The interface (27) between the microprocessor (22) and the various types of CPU memory is often referred to as a "local bus", but also may be a more generic or industry standard bus.

Many computing platforms are also provided with one or more storage drives (29), such as a hard-disk drives ("HDD"), floppy disk drives, compact disc drives (CD, CD-R, CD-RW, DVD, DVD-R, etc.), and proprietary disk and tape drives (e.g., Iomega Zip™ and Jaz™, Addonics SuperDisk™, etc.). Additionally, some storage drives may be accessible over a computer network.

Many computing platforms are provided with one or more communication interfaces (210), according to the function intended of the computing platform. For example, a personal computer is often provided with a high speed serial port (RS-232, RS-422, etc.), an enhanced parallel port ("EPP"), and one or more universal serial bus ("USB") ports. The computing platform may also be provided with a local area network ("LAN") interface, such as an Ethernet card, and other high-speed interfaces such as the High Performance Serial Bus IEEE-1394.

Computing platforms such as wireless telephones and wireless networked PDA's may also be provided with a radio frequency ("RF") interface with antenna, as well. In some cases, the computing platform may be provided with an infrared data arrangement ("IrDA") interface, too.

Computing platforms are often equipped with one or more internal expansion slots (211), such as Industry Standard Architecture ("ISA"), Enhanced Industry Standard Architecture ("EISA"), Peripheral Component Interconnect ("PCI"), or proprietary interface slots for the addition of other hardware, such as sound cards, memory boards, and graphics accelerators.

Additionally, many units, such as laptop computers and PDA's, are provided with one or more external expansion slots (212) allowing the user the ability to easily install and remove hardware expansion devices, such as PCMCIA cards, SmartMedia cards, and various proprietary modules such as removable hard drives, CD drives, and floppy drives.

Often, the storage drives (29), communication interfaces (210), internal expansion slots (211) and external expansion slots (212) are interconnected with the CPU (21) via a standard or industry open bus architecture (28), such as ISA, EISA, or PCI. In many cases, the bus (28) may be of a proprietary design.

A computing platform is usually provided with one or more user input devices, such as a keyboard or a keypad (216), and mouse or pointer device (217), and/or a touch-screen display (218). In the case of a personal computer, a full size keyboard is often provided along with a mouse or pointer device, such as a track ball or TrackPoint™. In the case of a web-enabled wireless telephone, a simple keypad may be provided with one or more function-specific keys. In the case of a PDA, a touch-screen (218) is usually provided, often with handwriting recognition capabilities.

Additionally, a microphone (219), such as the microphone of a web-enabled wireless telephone or the microphone of a personal computer, is supplied with the computing platform. This microphone may be used for simply reporting audio and voice signals, and it may also be used for entering user choices, such as voice navigation of web sites or auto-dialing telephone numbers, using voice recognition capabilities.

Many computing platforms are also equipped with a camera device (2100), such as a still digital camera or full motion video digital camera.

One or more user output devices, such as a display (213), are also provided with most computing platforms. The display (213) may take many forms, including a Cathode Ray Tube ("CRT"), a Thin Flat Transistor ("TFT") array, or a simple set of light emitting diodes ("LED") or liquid crystal display ("LCD") indicators.

One or more speakers (214) and/or annunciators (215) are often associated with computing platforms, too. The speakers (214) may be used to reproduce audio and music, such as the speaker of a wireless telephone or the speakers of a personal computer. Annunciators (215) may take the form of simple beep emitters or buzzers, commonly found on certain devices such as PDAs and PIMs.

These user input and output devices may be directly interconnected (28', 28") to the CPU (21) via a proprietary bus structure and/or interfaces, or they may be interconnected through one or more industry open buses such as ISA, EISA, PCI, etc.

The computing platform is also provided with one or more software and firmware (2101) programs to implement the desired functionality of the computing platforms.

Figure 2B:
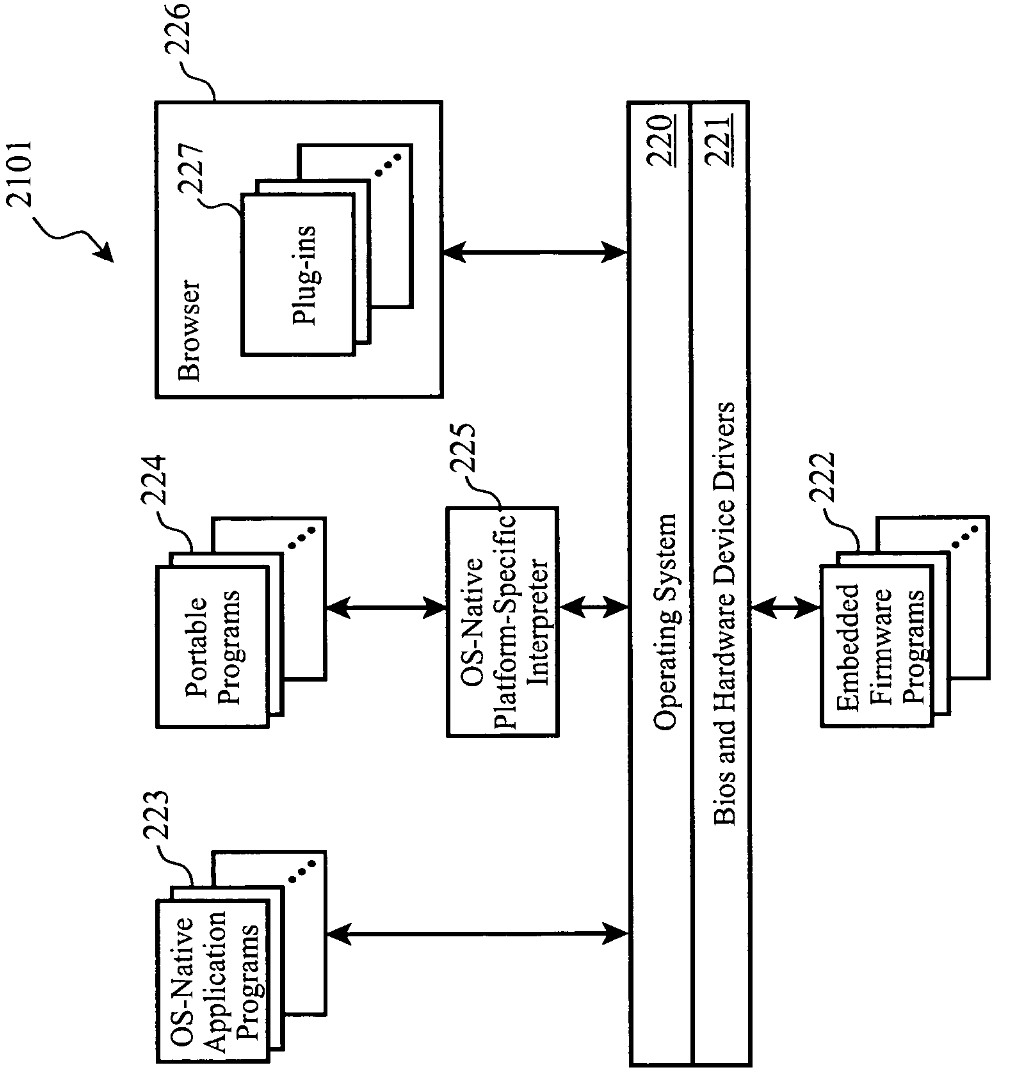

Turning to now FIG. 2*b*, more detail is given of a generalized organization of software and firmware (2101) on this range of computing platforms. One or more operating system ("OS") native application programs (223) may be provided on the computing platform, such as word processors, spreadsheets, contact management utilities, address book, calendar, email client, presentation, financial and bookkeeping programs.

Additionally, one or more "portable" or device-independent programs (224) may be provided, which must be interpreted by an OS-native platform-specific interpreter (225), such as Java™ scripts and programs.

Often, computing platforms are also provided with a form of web browser or micro-browser (226), which may also include one or more extensions to the browser such as browser plug-ins (227).

The computing device is often provided with an operating system (220), such as Microsoft Windows™, UNIX, IBM OS/2™, IBM AIX™, open source LINUX, Apple's MAC OS™, or other platform specific operating systems. Smaller devices such as PDA's and wireless telephones may be equipped with other forms of operating systems such as real-time operating systems ("RTOS") or Palm Computing's PalmOS™.

A set of basic input and output functions ("BIOS") and hardware device drivers (221) are often provided to allow the operating system (220) and programs to interface to and control the specific hardware functions provided with the computing platform.

Additionally, one or more embedded firmware programs (222) are commonly provided with many computing platforms, which are executed by onboard or "embedded" microprocessors as part of the peripheral device, such as a micro controller or a hard drive, a communication processor, network interface card, or sound or graphics card.

As such, FIGS. 2*a* and 2*b* describe in a general sense the various hardware components, software and firmware programs of a wide variety of computing platforms, including but not limited to personal computers, PDAs, PIMs, web-enabled telephones, and other appliances such as WebTV™ units. As such, we now turn our attention to disclosure of the present invention relative to the processes and methods preferably implemented as software and firmware on such a computing platform. It will be readily recognized by those skilled in the art that the following methods and processes may be alternatively realized as hardware functions, in part or in whole, without departing from the spirit and scope of the invention.

Service-based Embodiments

Alternative embodiments of the present invention include of some or all of the foregoing logical processes and functions of the invention being provided by configuring software, deploying software, downloading software, distributing software, or remotely serving clients in an on-demand environment.

Software Deployment Embodiment. According to one embodiment of the invention, the methods and processes of the invention are distributed or deployed as a service by a service provider to a client's computing system(s).

Figure 3A:
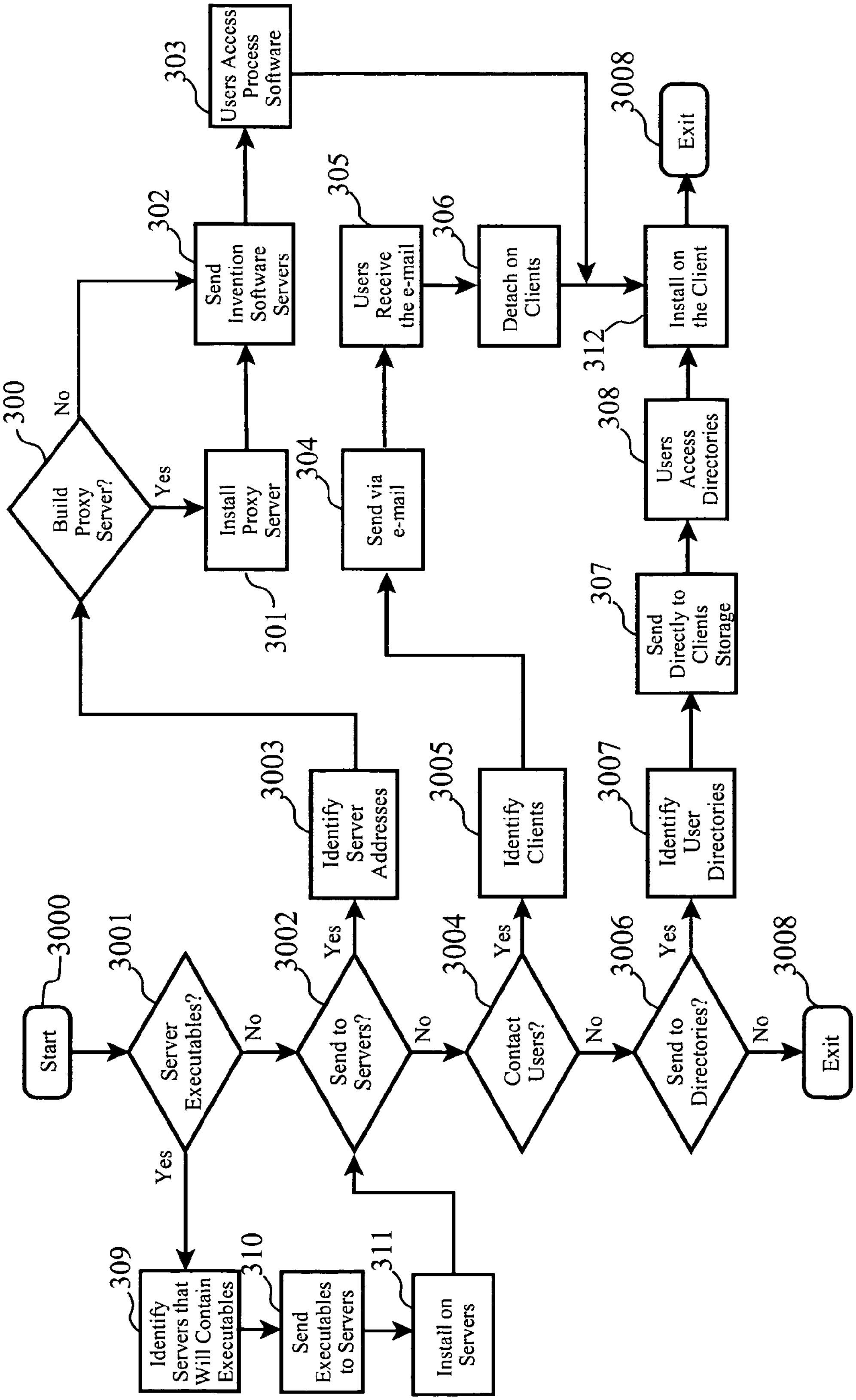
FIG. 3*a* sets for a logical process to deploy software to a client in which the deployed software embodies the methods and processes of the present invention.

Turning to FIG. 3*a*, the deployment process begins (3000) by determining (3001) if there are any programs that will reside on a server or servers when the process software is executed. If this is the case then the servers that will contain the executables are identified (309). The process software for the server or servers is transferred directly to the servers storage via FTP or some other protocol or by copying through the use of a shared files system (310). The process software is then installed on the servers (311).

Next a determination is made on whether the process software is to be deployed by having users access the process software on a server or servers (3002). If the users are to access the process software on servers then the server addresses that will store the process software are identified (3003).

In step (3004) a determination is made whether the process software is to be developed by sending the process software to users via e-mail. The set of users where the process software will be deployed are identified together with the addresses of the user client computers (3005). The process software is sent via e-mail to each of the user's client computers. The users then receive the e-mail (305) and then detach the process software from the e-mail to a directory on their client computers (306). The user executes the program that installs the process software on his client computer (312) then exits the process (3008).

A determination is made if a proxy server is to be built (300) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required then the proxy server is installed (301). The process software is sent to the servers either via a protocol such as FTP or it s copied directly from the source files to the server files via file sharing (302). Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems (303). Another embodiment is to have the servers automatically copy the process software to each client and then run the installation program for the process software at each client computer. The user executes the program that installs the process software on his client computer (312) then exits the process (3008).

Lastly, a determination is made on whether the process software will be sent directly to user directories on their client computers (3006). If so, the user directories are identified (3007). The process software is transferred directly to the user's client computer directory (307). This can be done in several ways such as but not limited to sharing of the file system directories and then copying from the sender's file system to the recipient user's file system or alternatively using a transfer protocol such as File Transfer Protocol ("FTP"). The users access the directories on their client file systems in preparation for installing the process software (308). The user executes the program that installs the process software on his client computer (312) then exits the process (3008).

Software Integration Embodiment. According to another embodiment of the present invention, software embodying the methods and processes disclosed herein are integrated as a service by a service provider to other software applications, applets, or computing systems.

Integration of the invention generally includes providing for the process software to coexist with applications, operating systems and network operating systems software and then installing the process software on the clients and servers in the environment where the process software will function.

Generally speaking, the first task is to identify any software on the clients and servers including the network operating system where the process software will be deployed that are required by the process software or that work in conjunction with the process software. This includes the network operating system that is software that enhances a basic operating system by adding networking features. Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists matches the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 3B:
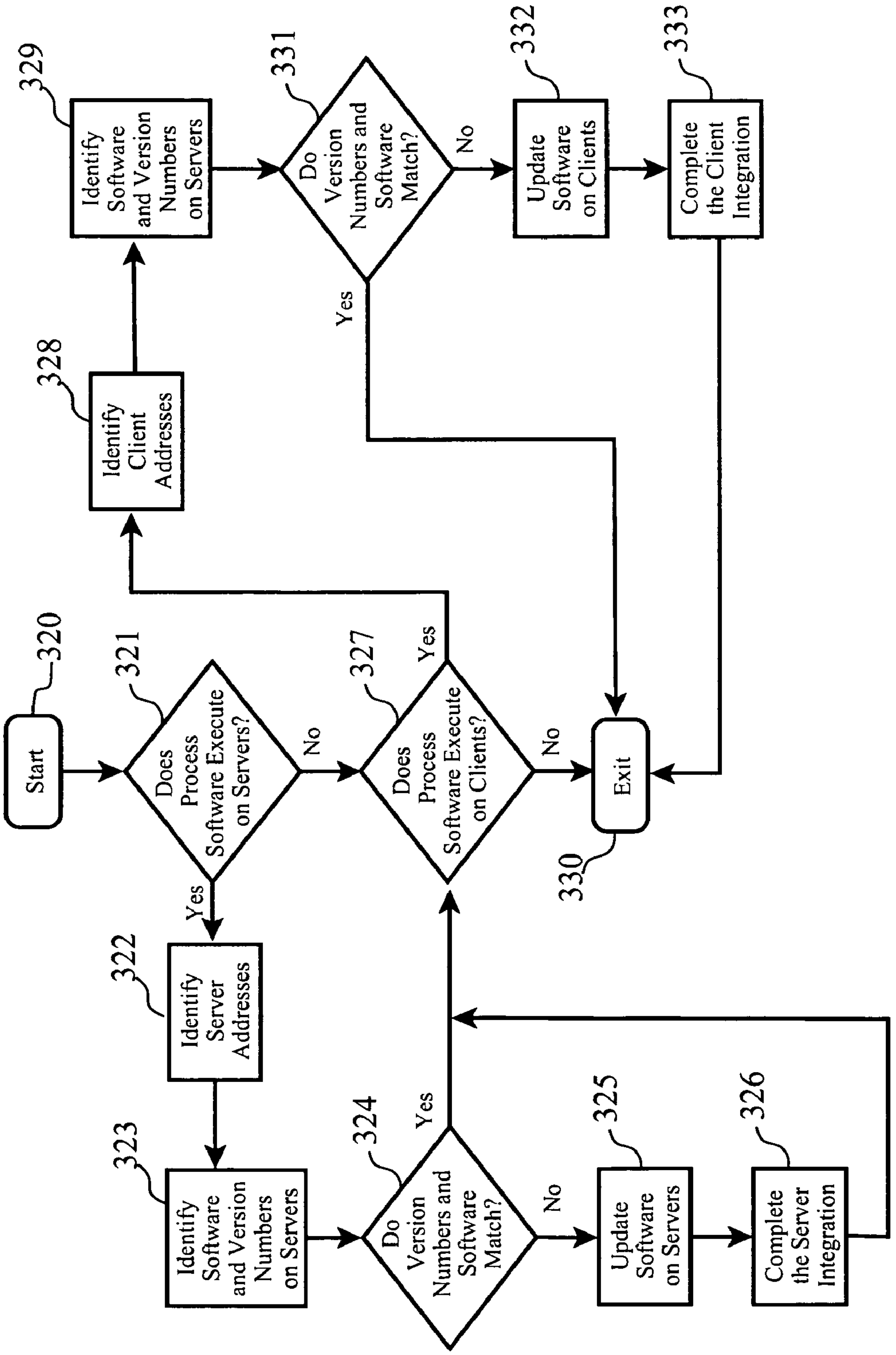
FIG. 3*b* sets for a logical process to integrate software to other software programs in which the integrated software embodies the methods and processes of the present invention.

Turning to FIG. 3*b*, details of the integration process according to the invention are shown. Integrating begins (320) by determining if there are any process software programs that will execute on a server or servers (321). If this is not the case, then integration proceeds to (327). If this is the case, then the server addresses are identified (322). The servers are checked to see if they contain software that includes the operating system ("OS"), applications, and network operating systems ("NOS"), together with their version numbers, that have been tested with the process software (323). The servers are also checked to determine if there is any missing software that is required by the process software (323).

A determination is made if the version numbers match the version numbers of OS, applications and NOS that have been tested with the process software (324). If all of the versions match and there is no missing required software the integration continues in (327).

If one or more of the version numbers do not match, then the unmatched versions are updated on the server or servers with the correct versions (325). Additionally if there is missing required software, then it is updated on the server or servers (325). The server integration is completed by installing the process software (326).

Step (327) which follows either (321), (324), or (326) determines if there are any programs of the process software that will execute on the clients. If no process software programs execute on the clients the integration proceeds to (330) and exits. If this is not the case, then the client addresses are identified (328).

The clients are checked to see if they contain software that includes the operating system ("OS"), applications, and network operating systems ("NOS"), together with their version numbers, that have been tested with the process software (329). The clients are also checked to determine if there is any missing software that is required by the process software (329).

A determination is made if the version numbers match the version numbers of OS, applications and NOS that have been tested with the process software 331. If all of the versions match and there is no missing required software, then the integration proceeds to (330) and exits.

If one or more of the version numbers do not match, then the unmatched versions are updated on the clients with the correct versions (332). In addition, if there is missing required software then it is updated on the clients (332). The client integration is completed by installing the process software on the clients (333). The integration proceeds to (330) and exits.

Application Programming Interface Embodiment. In another embodiment, the invention may be realized as a service or functionality available to other systems and devices via an Application Programming Interface ("API"). One such embodiment is to provide the service to a client system from a server system as a web service.

On-Demand Computing Services Embodiment. According to another aspect of the present invention, the processes and methods disclosed herein are provided through an on-demand computing architecture to render service to a client by a service provider.

Figure 3C:
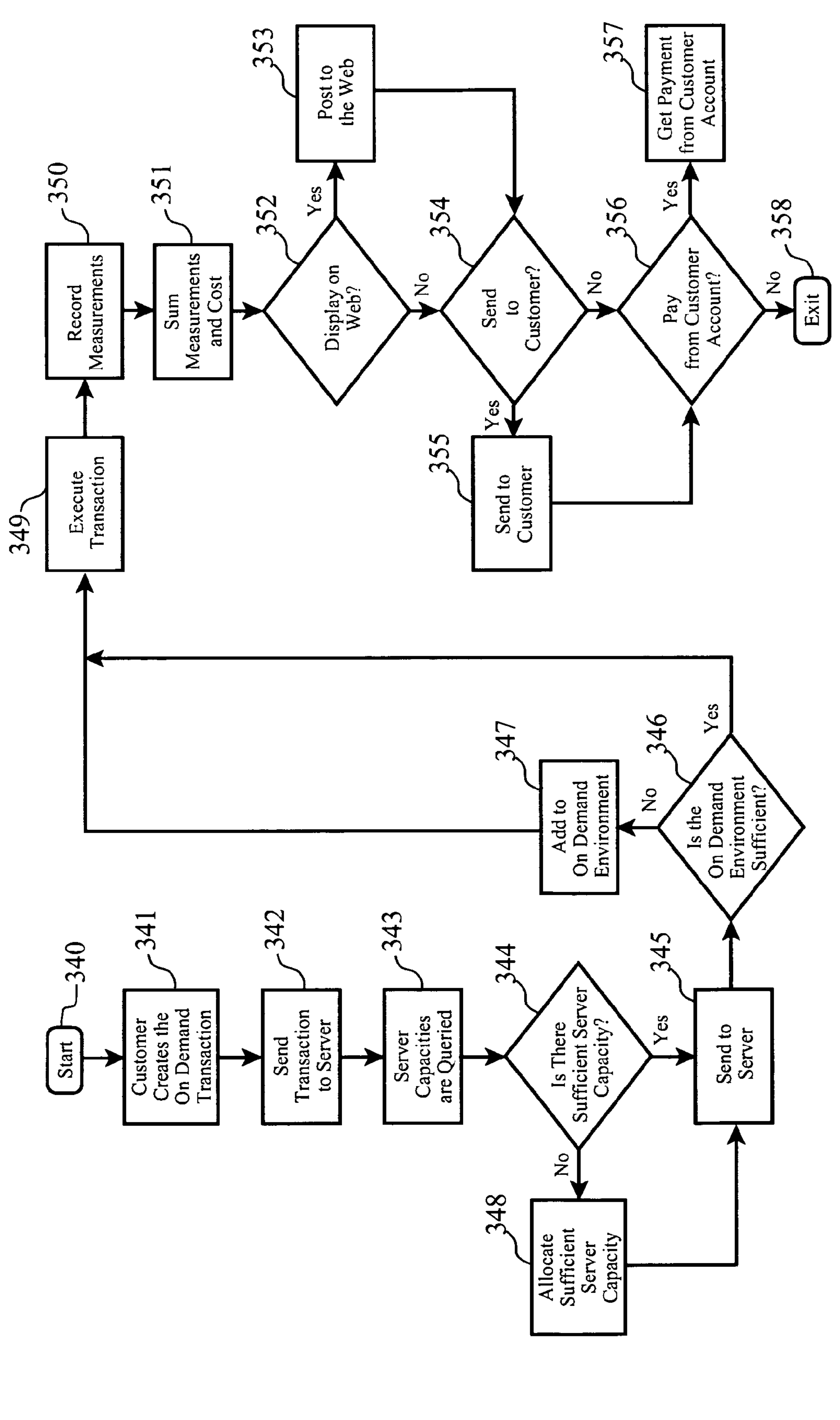
FIG. 3*c* sets for a logical process to execute software on behalf of a client in an on-demand computing system, in which the executed software embodies the methods and processes of the present invention.

Turning to FIG. 3*c*, generally speaking, the process software embodying the methods disclosed herein is shared, simultaneously serving multiple customers in a flexible, automated fashion. It is standardized, requiring little customization and it is scaleable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions, etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to effect the performance of that server, other servers are accessed to increase the capacity and to share the workload. Likewise when other measurements of use such as network bandwidth, memory usage, storage usage, etc. approach a capacity so as to effect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the computer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

FIG. 3*c* sets forth a detailed logical process which makes the present invention available to a client through an On-Demand process. A transaction is created that contains the unique customer identification, the requested service type and any service parameters that further specify the type of service (341). The transaction is then sent to the main server (342). In an On Demand environment the main server can initially be the only server, then as capacity is consume other servers are added to the On Demand environment.

The server central processing unit ("CPU") capacities in the On Demand environment are queried (343). The CPU requirement of the transaction is estimated, then the servers available CPU capacity in the On Demand environment are compared to the transaction CPU requirement to see if there is sufficient CPU available capacity in any server to process the transaction (344). If there is not sufficient server CPU available capacity, then additional server CPU capacity is allocated to process the transaction (348). If there was already sufficient available CPU capacity then the transaction is sent to a selected server (345).

Before executing the transaction, a check is made of the remaining On Demand environment to determine if the environment has sufficient available capacity for processing the transaction. This environment capacity consists of such things as but not limited to network bandwidth, processor memory, storage etc. (345). If there is not sufficient available capacity, then capacity will be added to the On Demand environment (347). Next the required software to process the transaction is accessed, loaded into memory, then the transaction is executed (349).

The usage measurements are recorded (350). The usage measurements consists of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (351).

If the customer has requested that the On Demand costs be posted to a web site (352) then they are posted (353). If the customer has requested that the On Demand costs be sent via e-mail to a customer address (354) then they are sent (355). If the customer has requested that the On Demand costs be paid directly from a customer account (356) then payment is received directly from the customer account (357). The last step is to exit the On Demand process.

Grid or Parallel Processing Embodiment. According to another embodiment of the present invention, multiple computers are used to simultaneously process individual audio tracks, individual audio snippets, or a combination of both, to yield output with less delay. Such a parallel computing approach may be realized using multiple discrete systems (e.g. a plurality of servers, clients, or both), or may be realized as an internal multiprocessing task (e.g. a single system with parallel processing capabilities).

VPN Deployment Embodiment. According to another aspect of the present invention, the methods and processes described herein may be embodied in part or in entirety in software which can be deployed to third parties as part of a service, wherein a third party VPN service is offered as a secure deployment vehicle or wherein a VPN is build on-demand as required for a specific deployment.

A virtual private network ("VPN") is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider ("ESP") sets a network access server ("NAS") and provides the remote users with desktop client software for their computers. The telecommuters can then dial a toll-free number to attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a companies multiple fixed sites over a public network such as the Internet.

The process software is transported over the VPN via tunneling which is the process of placing an entire packet within another packet and sending it over the network. The protocol of the outer packet is understood by the network and both points, called tunnel interfaces, where the packet enters and exits the network.

Figure 3D:
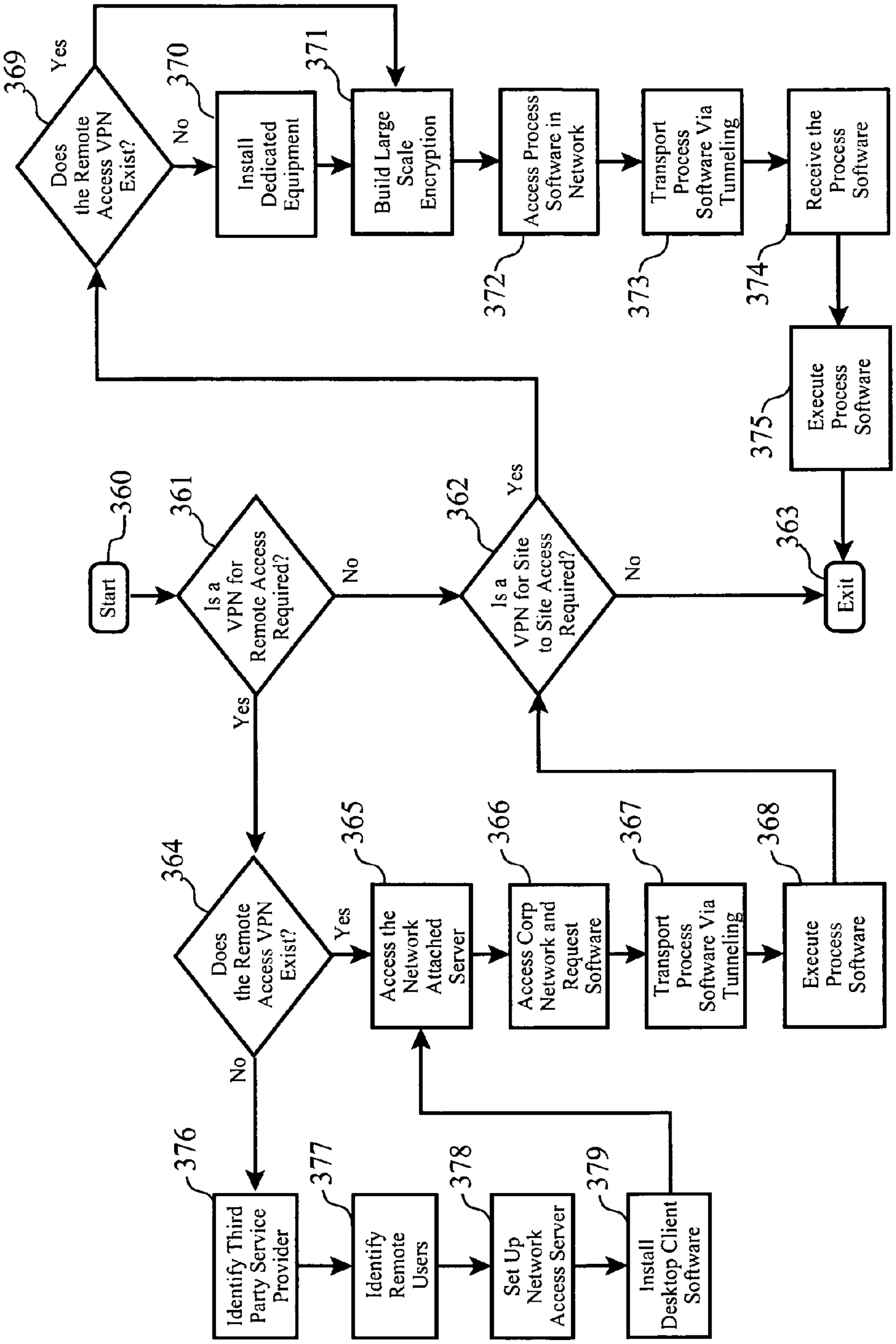
FIG. 3*d* sets for a logical process to deploy software to a client via a virtual private network, in which the deployed software embodies the methods and processes of the present invention.

Turning to FIG. 3*d*, VPN deployment process starts (360) by determining if a VPN for remote access is required (361). If it is not required, then proceed to (362). If it is required, then determine if the remote access VPN exits (364).

If a VPN does exist, then the VPN deployment process proceeds (365) to identify a third party provider that will provide the secure, encrypted connections between the company's private network and the company's remote users (376). The company's remote users are identified (377). The third party provider then sets up a network access server ("NAS") (378) that allows the remote users to dial a toll free number or attach directly via a broadband modem to access, download and install the desktop client software for the remote-access VPN (379).

After the remote access VPN has been built or if it has been previously installed, the remote users can access the process software by dialing into the NAS or attaching directly via a cable or DSL modem into the NAS (365). This allows entry into the corporate network where the process software is accessed (366). The process software is transported to the remote user's desktop over the network via tunneling. That is the process software is divided into packets and each packet including the data and protocol is placed within another packet (367). When the process software arrives at the remote user's desktop, it is removed from the packets, reconstituted and then is executed on the remote users desktop (368).

A determination is made to see if a VPN for site to site access is required (362). If it is not required, then proceed to exit the process (363). Otherwise, determine if the site to site VPN exists (369). If it does exist, then proceed to (372). Otherwise, install the dedicated equipment required to establish a site to site VPN (370). Then build the large scale encryption into the VPN (371).

After the site to site VPN has been built or if it had been previously established, the users access the process software via the VPN (372). The process software is transported to the site users over the network via tunneling. That is the process software is divided into packets and each packet including the data and protocol is placed within another packet (374). When the process software arrives at the remote user's desktop, it is removed from the packets, reconstituted and is executed on the site users desktop (375). Proceed to exit the process (363).

Computer-Readable Media Embodiments

In another embodiment of the invention, logical processes according to the invention and described herein are encoded on or in one or more computer-readable media. Some computer-readable media are read-only (e.g. they must be initially programmed using a different device than that which is ultimately used to read the data from the media), some are write-only (e.g. from a the data encoders perspective they can only be encoded, but not read simultaneously), or read-write. Still some other media are write-once, read-many-times.

Some media are relatively fixed in their mounting mechanisms, while others are removable, or even transmittable. All computer-readable media form two types of systems when encoded with data and/or computer software: (a) when removed from a drive or reading mechanism, they are memory devices which generate useful data-driven outputs when stimulated with appropriate electromagnetic, electronic, and/or optical signals; and (b) when installed in a drive or reading device, they form a data repository system accessible by a computer.

Figure 4A:
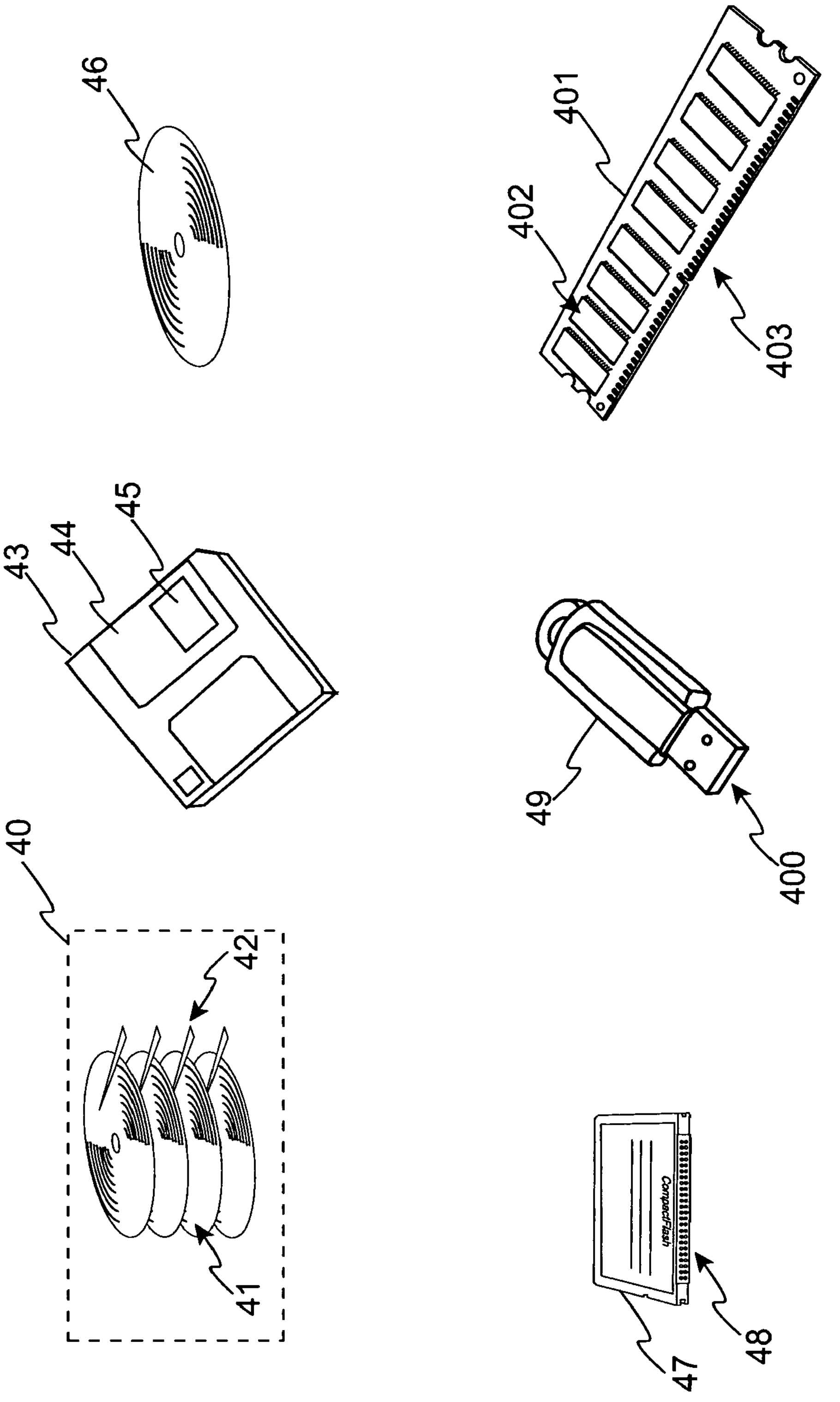
FIGS. 4*a*, 4*b* and 4*c*, illustrate computer readable media of various removable and fixed types, signal transceivers, and parallel-to-serial-to-parallel signal circuits.

FIG. 4*a* illustrates some computer readable media including a computer hard drive (40) having one or more magnetically encoded platters or disks (41), which may be read, written, or both, by one or more heads (42). Such hard drives are typically semi-permanently mounted into a complete drive unit, which may then be integrated into a configurable computer system such as a Personal Computer, Server Computer, or the like.

Similarly, another form of computer readable media is a flexible, removable "floppy disk" (43), which is inserted into a drive which houses an access head. The floppy disk typically includes a flexible, magnetically encodable disk which is accessible by the drive head through a window (45) in a sliding cover (44).

A Compact Disk ("CD") (46) is usually a plastic disk which is encoded using an optical and/or magneto-optical process, and then is read using generally an optical process. Some CD's are read-only ("CD-ROM"), and are mass produced prior to distribution and use by reading-types of drives. Other CD's are writable (e.g. "CD-RW", "CD-R"), either once or many time. Digital Versatile Disks ("DVD") are advanced versions of CD's which often include double-sided encoding of data, and even multiple layer encoding of data. Like a floppy disk, a CD or DVD is a removable media.

Another common type of removable media are several types of removable circuit-based (e.g. solid state) memory devices, such as Compact Flash ("CF") (47), Secure Data ("SD"), Sony's MemoryStick, Universal Serial Bus ("USB") FlashDrives and "Thumbdrives" (49), and others. These devices are typically plastic housings which incorporate a digital memory chip, such as a battery-backed random access chip ("RAM"), or a Flash Read-Only Memory ("FlashROM"). Available to the external portion of the media is one or more electronic connectors (48, 400) for engaging a connector, such as a CF drive slot or a USB slot. Devices such as a USB FlashDrive are accessed using a serial data methodology, where other devices such as the CF are accessed using a parallel methodology. These devices often offer faster access times than disk-based media, as well as increased reliability and decreased susceptibility to mechanical shock and vibration. Often, they provide less storage capability than comparably priced disk-based media.

Yet another type of computer readable media device is a memory module (403), often referred to as a SIMM or DIMM. Similar to the CF, SD, and FlashDrives, these modules incorporate one or more memory devices (402), such as Dynamic RAM ("DRAM"), mounted on a circuit board (401) having one or more electronic connectors for engaging and interfacing to another circuit, such as a Personal Computer motherboard. These types of memory modules are not usually encased in an outer housing, as they are intended for installation by trained technicians, and are generally protected by a larger outer housing such as a Personal Computer chassis.

Figure 4B:
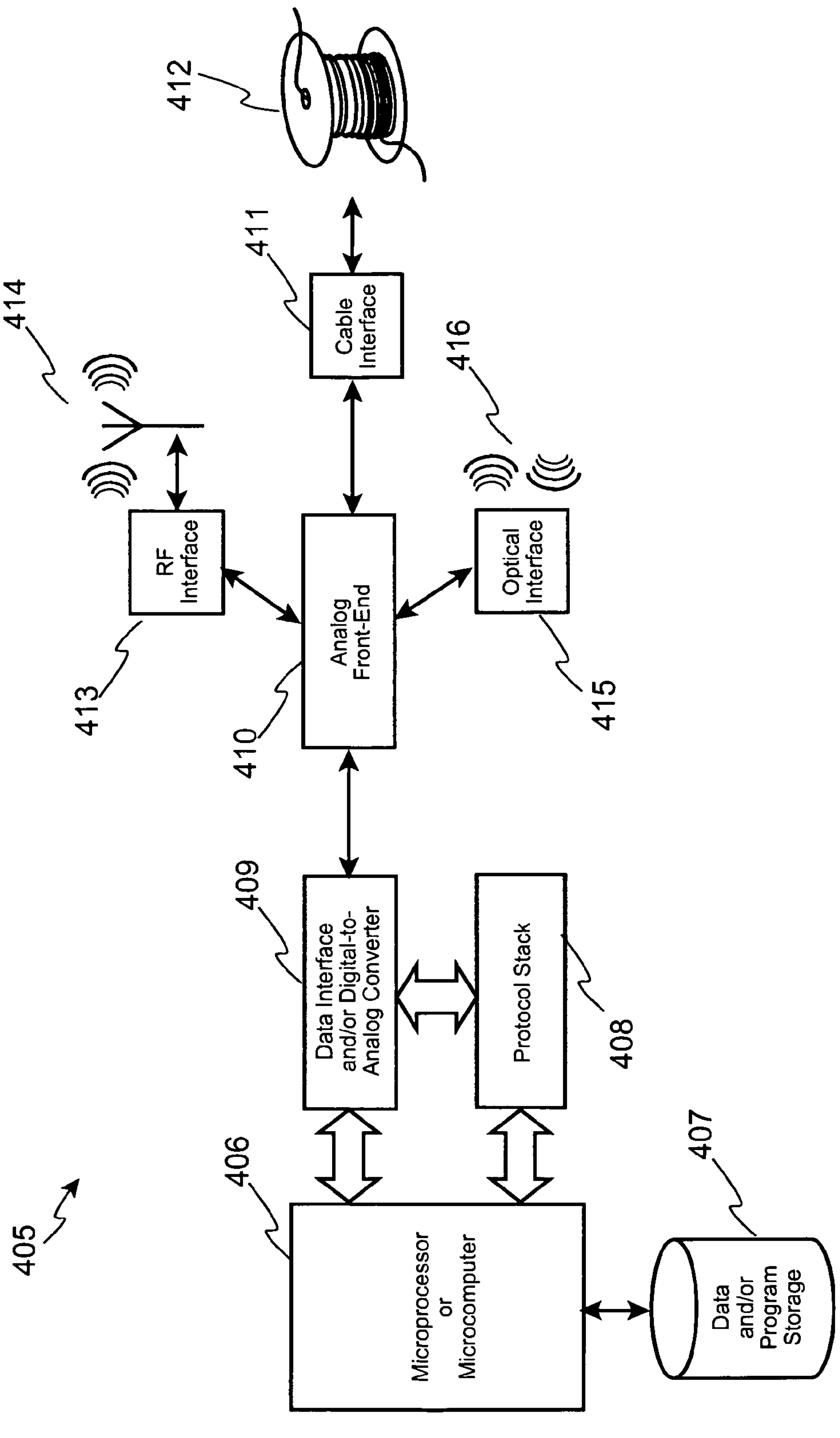

Turning now to FIG. 4*b*, another embodiment option (405) of the present invention is shown in which a computer-readable signal is encoded with software, data, or both, which implement logical processes according to the invention. FIG. 4*b* is generalized to represent the functionality of wireless, wired, electro-optical, and optical signaling systems. For example, the system shown in FIG. 4*b* can be realized in a manner suitable for wireless transmission over Radio Frequencies ("RF"), as well as over optical signals, such as InfraRed Data Arrangement ("IrDA"). The system of FIG. 4*b* may also be realized in another manner to serve as a data transmitter, data receiver, or data transceiver for a USB system, such as a drive to read the aforementioned USB FlashDrive, or to access the serially-stored data on a disk, such as a CD or hard drive platter.

In general, a microprocessor or microcontroller (406) reads, writes, or both, data to/from storage for data, program, or both (407). A data interface (409), optionally including a digital-to-analog converter, cooperates with an optional protocol stack (408), to send, receive, or transceive data between the system front-end (410) and the microprocessor (406). The protocol stack is adapted to the signal type being sent, received, or transceived. For example, in a Local Area Network ("LAN") embodiment, the protocol stack may implement Transmission Control Protocol/Internet Protocol ("TCP/IP"). In a computer-to-computer or computer-to-peripheral embodiment, the protocol stack may implement all or portions of USB, "FireWire", RS-232, Point-to-Point Protocol ("PPP"), etc.

The system's front-end, or analog front-end, is adapted to the signal type being modulated, demodulate, or transcoded. For example, in an RF-based (413) system, the analog front-end comprises various local oscillators, modulators, demodulators, etc., which implement signaling formats such as Frequency Modulation ("FM"), Amplitude Modulation ("AM"), Phase Modulation ("PM"), Pulse Code Modulation ("PCM"), etc. Such an RF-based embodiment typically includes an antenna (414) for transmitting, receiving, or transceiving electromagnetic signals via open air, water, earth, or via RF wave guides and coaxial cable. Some common open air transmission standards are BlueTooth, Global Services for Mobile Communications ("GSM"), Time Division Multiple Access ("TDMA"), Advanced Mobile Phone Service ("AMPS"), and Wireless Fidelity ("Wi-Fi").

In another example embodiment, the analog front-end may be adapted to sending, receiving, or transceiving signals via an optical interface (415), such as laser-based optical interfaces (e.g. Wavelength Division Multiplexed, SONET, etc.), or Infra Red Data Arrangement ("IrDA") interfaces (416). Similarly, the analog front-end may be adapted to sending, receiving, or transceiving signals via cable (412) using a cable interface, which also includes embodiments such as USB, Ethernet, LAN, twisted-pair, coax, Plain-old Telephone Service ("POTS"), etc.

Signals transmitted, received, or transceived, as well as data encoded on disks or in memory devices, may be encoded to protect it from unauthorized decoding and use. Other types of encoding may be employed to allow for error detection, and in some cases, correction, such as by addition of parity bits or Cyclic Redundancy Codes ("CRC"). Still other types of encoding may be employed to allow directing or "routing" of data to the correct destination, such as packet and frame-based protocols.

Figure 4C:
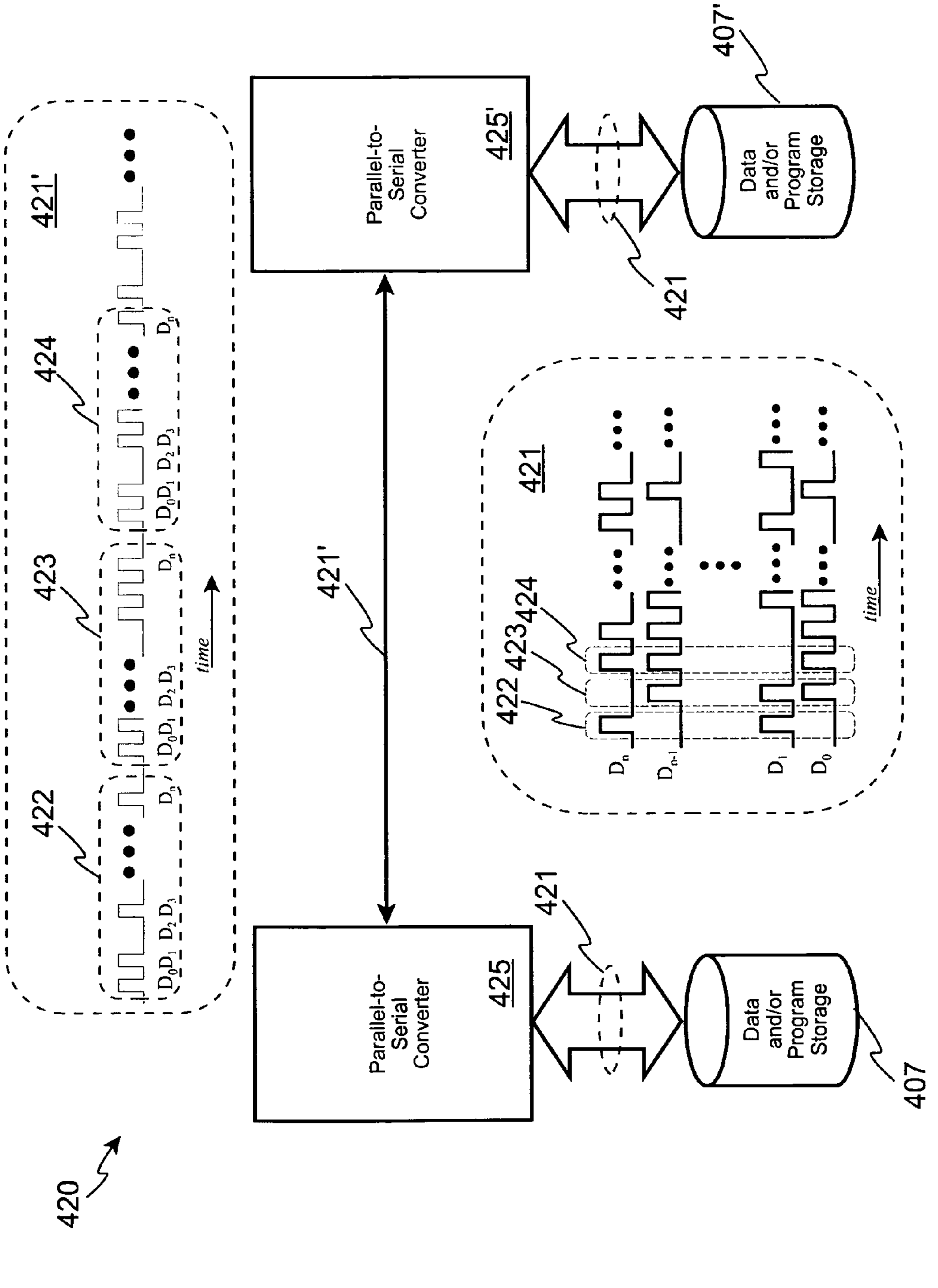

FIG. 4*c* illustrates conversion systems which convert parallel data to and from serial data. Parallel data is most often directly usable by microprocessors, often formatted in 8-bit wide bytes, 16-bit wide words, 32-bit wide double words, etc. Parallel data can represent executable or interpretable software, or it may represent data values, for use by a computer. Data is often serialized in order to transmit it over a media, such as an RF or optical channel, or to record it onto a media, such as a disk. As such, many computer-readable media systems include circuits, software, or both, to perform data serialization and re-parallelization.

Parallel data (421) can be represented as the flow of data signals aligned in time, such that parallel data unit (byte, word, d-word, etc.) (422, 423, 424) is transmitted with each bit $D_0$–$D_n$ being on a bus or signal carrier simultaneously, where the "width" of the data unit is n−1. In some systems, $D_0$ is used to represent the least significant bit ("LSB"), and in other systems, it represents the most significant bit ("MSB"). Data is serialized (421) by sending one bit at a time, such that each data unit (422, 423, 424) is sent in serial fashion, one after another, typically according to a protocol.

As such, the parallel data stored in computer memory (407, 407') is often accessed by a microprocessor or Parallel-to-Serial Converter (425, 425') via a parallel bus (421), and exchanged (e.g. transmitted, received, or transceived) via a serial bus (421'). Received serial data is converted back into parallel data before storing it in computer memory, usually. The serial bus (421') generalized in FIG. 4*c* may be a wired bus, such as USB or Firewire, or a wireless communications medium, such as an RF or optical channel, as previously discussed.

In these manners, various embodiments of the invention may be realized by encoding software, data, or both, according to the logical processes of the invention, into one or more computer-readable mediums, thereby yielding a product of manufacture and a system which, when properly read, received, or decoded, yields useful programming instructions, data, or both, including, but not limited to, the computer-readable media types described in the foregoing paragraphs.

CONCLUSION

While certain examples and details of a preferred embodiment have been disclosed, it will be recognized by those skilled in the are that variations in implementation such as use of different programming methodologies, computing platforms, and processing technologies, may be adopted without departing from the spirit and scope of the present invention. Therefore, the scope of the invention should be determined by the following claims.

What is claimed is:

1. A system for cadence management of translated multi-speaker conversations comprising:

a pause relationship manager having a hardware function for executing a logical process, the hardware means comprising at least one hardware function selected from a group comprising a microprocessor and an integrated circuit;

a demultiplexer portion of the pause relationship manager separating a multi-speaker audio stream into a plurality of single-speaker audio tracks, each track containing one or more first language audio snippets organized according to a timing relationship as related in said multi-speaker audio stream;

a pause analyzer portion of the pause relationship manager generating a pause relationship model by determining time relationships between said single-speaker snippets, and assigning pause marker values denoting the each beginning and each ending of each mutual silence pause;

a pause relationship manager portion of the pause relationship manager collecting a translated language audio track corresponding to each of said single-speaker tracks, and generating one or more pause relationship controls according to a transformation of said pause relationship model;

a multiplexer portion of the pause relationship manager producing a multi-speaker audio output including said translated tracks in which said translated snippets are related in time according to said pause relationship controls.

2. The system as set forth in claim 1 wherein said pause analyzer is configured to designate a phrase snippet as a snippet following a mutual silence, to designate every other snippet occurring during said phrase snippet as an interruption snippet, wherein said generated pause relationship model reflects records time values elapsed between the starts and ends of said phrase snippet and said interrupt snippets relative to said pause marker values.

3. The system as set forth in claim 1 wherein said pause analyzer is configured to designate a phrase snippet as a snippet corresponding to a specified speaker, to designate each snippet corresponding to a non-specified speaker occurring during said phrase snippet as an interruption snippet, wherein said generated pause relationship model reflects records time values elapsed between the starts and ends of said phrase snippet and said interrupt snippets relative to said pause marker values.

4. The system as set forth in claim 1 wherein said pause relationship manager transforms said pause relationship model to produce beginnings of translated snippets synchronized with beginnings of said first language snippets.

5. The system as set forth in claim 1 wherein said pause relationship manager transforms said pause relationship model to produce beginnings of translated snippets offset by a calculated delay from a beginning of a snippet which corresponds to a pause marker at a end of a mutual silence.

6. The system as set forth in claim 5 wherein said delay is determined according to a proportional relationship mode of pause management.

7. The system as set forth in claim 5 wherein said delay is determined according to absolute relationship mode of pause management.

8. The system as set forth in claim 1 wherein said multiplexer comprises one or more variable delay buffers for delaying output of said translated snippets according to said pause relationship controls.

9. The system as set forth in claim 1 comprising one or more integrated circuitsin which one or more of said demultiplexer, said analyzer, said manager, and said multiplexer are embodied.

10. The system as set forth in claim 1 comprising one or more programmed computers in which one or more of said demultiplexer, said analyzer, said manager, and said multiplexer are embodied.

11. presented) A machine-automated method for cadence management of translated multi-speaker conversations comprising:

separating a multi-speaker audio stream into a plurality of single-speaker audio tracks, each track containing one or more first language audio snippets organized according to a timing relationship as related in said multi-speaker audio stream;

generating a pause relationship model by determining time relationships between said single-speaker snippets, and assigning pause marker values denoting the each beginning and each ending of each mutual silence pause;

collecting a translated language audio track corresponding to each of said single-speaker tracks, and generating one or more pause relationship controls according to a transformation of said pause relationship model;

producing a multi-speaker audio output including said translated tracks in which said translated snippets are related in time according to said pause relationship controls.

12. The method as set forth in claim 11 further comprising designating a phrase snippet as a snippet following a mutual silence, designating every other snippet occurring during said phrase snippet as an interruption snippet, wherein said generated pause relationship model reflects records time values elapsed between the starts and ends of said phrase snippet and said interrupt snippets relative to said pause marker values.

13. The method as set forth in claim 11 further comprising designating a phrase snippet as a snippet corresponding to a specified speaker, designating each snippet corresponding to a non-specified speaker occurring during said phrase snippet as an interruption snippet, wherein said generated pause relationship model reflects records time values elapsed between the starts and ends of said phrase snippet and said interrupt snippets relative to said pause marker values.

14. The method as set forth in claim 11 further comprising transforming said pause relationship model to produce beginnings of translated snippets synchronized with beginnings of said first language snippets.

15. The method as set forth in claim 11 further comprising transforming said pause relationship model to produce beginnings of translated snippets offset by a calculated delay from a beginning of a snippet which corresponds to a pause marker at a end of a mutual silence.

16. The method as set forth in claim 15 wherein said delay is determined according to a proportional relationship mode of pause management.

17. The method as set forth in claim 15 wherein said delay is determined according to absolute relationship mode of pause management.

18. The method as set forth in claim 11 comprising variably delaying output of said translated snippets according to said pause relationship controls.

19. presented) The method as set forth in claim 11 comprising providing one or more integrated circuits performing one or more of said steps of separating, generating, managing, and producing.

20. The method as set forth in claim 11 comprising executing one or more computers to perform one or more of said steps of separating, generating, managing, and producing.

21. amended) A computer readable memory comprising:

one or more computer-readable storage memories, operable to be encoded, decoded, or both encoded and decoded, by a computer, selected from a group consisting of a memory device and a storage drive;

one or more software programs encoded on said memory, said programs causing a processor to:

separate a multi-speaker audio stream into a plurality of single-speaker audio tracks, each track containing one or more first language audio snippets organized according to a timing relationship as related in said multi-speaker audio stream;

generate a pause relationship model by determining time relationships between said single-speaker snippets, and assigning pause marker values denoting the each beginning and each ending of each mutual silence pause;

collect a translated language audio track corresponding to each of said single-speaker tracks, and generating one or more pause relationship controls according to a transformation of said pause relationship model; and produce a multi-speaker audio output including said translated tracks in which said translated snippets are related in time according to said pause relationship controls.

22. The storage memory as set forth in claim 21 wherein said software designates a phrase snippet as a snippet following a mutual silence, to designating every other snippet occurring during said phrase snippet as an interruption snippet, wherein said generated pause relationship model reflects records time values elapsed between the staffs and ends of said phrase snippet and said interrupt snippets relative to said pause marker values.

23. The storage memory as set forth in claim 21 wherein said software designates a phrase snippet as a snippet corresponding to a specified speaker, to designate each snippet corresponding to a non-specified speaker occurring during said phrase snippet as an interruption snippet, wherein said generated pause relationship model reflects records time values elapsed between the starts and ends of said phrase snippet and said interrupt snippets relative to said pause marker values.

24. The storage memory as set forth in claim 21 wherein said software transforms said pause relationship model to produce beginnings of translated snippets synchronized with beginnings of said first language snippets.

25. The storage memory as set forth in claim 21 wherein said software transforms said pause relationship model to produce beginnings of translated snippets offset by a calculated delay from a beginning of a snippet which corresponds to a pause marker at a end of a mutual silence.

26. The storage memory as set forth in claim 25 wherein said delay is determined according to a proportional relationship mode of pause management.

27. The storage memory as set forth in claim 25 wherein said delay is determined according to absolute relationship mode of pause management.

28. The storage memory as set forth in claim 21 wherein said software variably delays output of said translated snippets according to said pause relationship controls.

29. The storage memory as set forth in claim 21 wherein said computer-readable memory comprises an integrated circuit memory device.

30. The storage memory as set forth in claim 21 wherein said computer-readable media comprises a computer disk.

* * * * *